US011674447B2

(12) United States Patent
Shealy et al.

(10) Patent No.: US 11,674,447 B2
(45) Date of Patent: Jun. 13, 2023

(54) SKIRTED SEAL APPARATUS

(71) Applicant: General Electric Company, Schenectady, NY (US)

(72) Inventors: James Shealy, Cincinnati, OH (US); Donald M. Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/361,479

(22) Filed: Jun. 29, 2021

(65) Prior Publication Data
US 2022/0412266 A1    Dec. 29, 2022

(51) Int. Cl.
*F02C 7/28* (2006.01)
*F16J 15/06* (2006.01)

(52) U.S. Cl.
CPC .............. *F02C 7/28* (2013.01); *F16J 15/06* (2013.01); *F05D 2240/55* (2013.01)

(58) Field of Classification Search
CPC .... F16J 15/00; F16J 15/02; F16J 15/06; F16J 15/061; F16J 15/062; F16J 15/064; F02C 7/00; F02C 7/04; F02C 7/042; F02C 7/28; F05D 2240/00; F05D 2240/55; F05D 2240/57; F05D 2240/59
USPC ........................................................ 277/345
See application file for complete search history.

(56) References Cited

U.S. PATENT DOCUMENTS

| | | |
|---|---|---|
| 3,121,995 A | 2/1964 | Albani |
| 3,167,206 A | 1/1965 | Nelson |
| 3,422,981 A | 1/1969 | Obrien |
| 4,575,006 A | 3/1986 | Madden |
| 4,575,099 A | 3/1986 | Nash |
| 4,739,932 A | 4/1988 | Szuminski |
| 4,815,276 A | 3/1989 | Hansel |
| 4,917,302 A | 4/1990 | Steinetz |

(Continued)

FOREIGN PATENT DOCUMENTS

| | | |
|---|---|---|
| DE | 3026245 | 11/1997 |
| EP | 1491931 | 12/2004 |

(Continued)

OTHER PUBLICATIONS

USPTO; U.S. Appl. No. 17/407,439, Application filed Aug. 20, 2021, entitled "Plunger Seal Assembly and Sealing Method,".

(Continued)

*Primary Examiner* — Nathan Cumar
(74) *Attorney, Agent, or Firm* — Fitch, Even, Tabin & Flannery, LLP

(57) ABSTRACT

Apparatuses are provided herein useful to sealing a gap between a movable flap and a stationary structure, such as a gap between a gas turbine engine nozzle flap and a corresponding sidewall. An apparatus for sealing such a gap may be a dynamic skirted leaf seal which may include a flap arm, a wall arm opposite the flap arm, and a support arm disposed between the flap and wall arms. A distal end portion of the flap arm may comprise a first skirt and a distal end portion of the support arm may comprise a second skirt that engages the first skirt. When positioned in a gap, the skirted leaf seal may exert a force to urge the first flap arm towards the flap and to urge the wall arm and the support arm towards the structure to seal the gap.

19 Claims, 14 Drawing Sheets

(56) References Cited

U.S. PATENT DOCUMENTS

| | | | |
|---|---|---|---|
| 5,115,979 A | 5/1992 | Ellerhorst | |
| 5,143,292 A | 9/1992 | Corsmeier | |
| 5,288,020 A | 2/1994 | Pirker | |
| 5,323,965 A | 6/1994 | Froemming | |
| 5,417,441 A * | 5/1995 | Hill | F02K 1/805 239/265.11 |
| 5,522,546 A | 6/1996 | Jarvis | |
| 5,676,312 A * | 10/1997 | Lapergue | F02K 1/1223 239/265.33 |
| 6,702,300 B1 | 3/2004 | Steinetz | |
| 7,775,048 B2 | 8/2010 | Grammel, Jr. | |
| 9,016,695 B2 * | 4/2015 | Treat | F16J 15/061 277/637 |
| 9,103,298 B2 | 8/2015 | Gormley | |
| 9,341,120 B2 | 5/2016 | Barry, Jr. | |
| 9,810,085 B2 | 11/2017 | McMahon | |
| 10,513,939 B2 | 12/2019 | Roberge | |
| 10,550,707 B2 | 2/2020 | Boeck | |
| 10,969,015 B2 | 4/2021 | George | |
| 11,047,481 B2 | 6/2021 | Bidkar | |
| 2008/0000236 A1 | 1/2008 | Grammel | |
| 2013/0033005 A1 | 2/2013 | Treat | |
| 2016/0076391 A1 | 3/2016 | Guinn | |
| 2017/0146130 A1 * | 5/2017 | Yanagisawa | F16J 15/34 |
| 2018/0149032 A1 * | 5/2018 | Boeck | F01D 11/005 |
| 2018/0202659 A1 | 7/2018 | Stieg | |
| 2018/0328313 A1 | 11/2018 | Senofonte | |
| 2018/0335143 A1 | 11/2018 | George | |
| 2019/0170007 A1 | 6/2019 | Davis | |
| 2019/0203842 A1 | 7/2019 | Bidkar | |
| 2022/0042423 A1 | 2/2022 | Hopper | |
| 2022/0403798 A1 | 12/2022 | Shealy | |
| 2022/0412464 A1 | 12/2022 | Shealy | |
| 2023/0054950 A1 | 2/2023 | Shealy | |

FOREIGN PATENT DOCUMENTS

| | | |
|---|---|---|
| EP | 2511481 | 10/2012 |
| EP | 3744964 | 12/2020 |
| EP | 4086436 | 11/2022 |
| FR | 3127024 | 3/2023 |
| FR | 3127025 | 3/2023 |
| FR | 3127269 | 3/2023 |
| KR | 100440720 | 3/2003 |

OTHER PUBLICATIONS

USPTO; U.S. Appl. No. 17/407,439; Non-Final Office Action dated Dec. 9, 2022; (pp. 15).

USPTO; U.S. Appl. No. 17/567,385; Application filed Jan. 3, 2022, entitled "Plunger Seal Apparatus and Sealing Method".

USPTO; U.S. Appl. No. 17/567,385; Non-Final Office Action dated Mar. 8, 2023; (pp. 9).

USPTO; U.S. Appl. No. 17/578,717, Application filed Jan. 19, 2022, entitled "Seal Assembly and Sealing Method,".

USPTO; U.S. Appl. No. 17/578,717; Notice of Allowance dated Mar. 23, 2023; (pp. 12).

USPTO; U.S. Appl. No. 17/578,717; Notice of Allowance dated Dec. 12, 2022; (pp. 12).

USPTO; U.S. Appl. No. 17/578,717; Restriction Requirement dated Sep. 20, 2022; (pp. 7).

USPTO; U.S. Appl. No. 17/352,605; Notice of Allowance and Fees Due (PTOL-85) dated Jan. 18, (pp. 1-9).

USPTO; U.S. Appl. No. 17/362,391; Non-Final Rejection dated Jan. 31, 2023; (pp. 1-8).

* cited by examiner

SKIRTED SEAL APPARATUS

GOVERNMENT INTERESTS

This invention was made with United States Government support. The Government has certain rights to this invention.

TECHNICAL FIELD

This technical field relates generally to dynamic seals for sealing a gap between a movable component and a stationary structure and, more specifically, to dynamic seals usable in a gas turbine engine exhaust nozzle.

BACKGROUND

A gas turbine engine, such as a gas turbine engine for powering an aircraft, may include an exhaust nozzle downstream of the turbine. The exhaust nozzle may include a movable flap positioned between the nozzle sidewalls. The flap may be actuated via a series of linkages to control a two-dimensional area within the nozzle to direct and accelerate the flow of core air from the engine for the purpose of thrust. Gaps between the flap and the nozzle sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION

Aspects and advantages of the present disclosure will be set forth in part in the following description, or may be obvious from the description, or may be learned through practice of the present disclosure.

In an aspect of the present disclosure, a seal apparatus comprises a first seal or a flap arm having a first proximal end portion, a first distal end portion with a first bend, and a first skirt extending away from the first bend; a second seal or a wall arm opposite the first seal and defining an interior space therebetween, the second seal having a second proximal end portion coupled to the first proximal end portion and a second distal end portion, the first skirt extending into the interior space; and a support associated with the second seal, the support being disposed in the interior space, wherein the first seal biases away from the second seal to seal a gap between a moveable flap and a stationary structure.

In another aspect of the present disclosure, a gas turbine nozzle comprises a sidewall; a movable flap adjacent the sidewall; and a seal apparatus disposed between the sidewall and the moveable flap to seal a gap between the sidewall and the moveable flap, the seal apparatus operably coupled to the moveable flap and comprising: a first seal or flap arm having a first proximal end portion, a first distal end portion with a first bend, and a first skirt extending away from the first bend; a second seal or a wall arm opposite the first seal and defining an interior space therebetween, the second seal having a second proximal end portion coupled to the first proximal end portion of the first seal, the first skirt extending into the interior space; and a support arm associated with the second seal, the support being disposed in the interior space, wherein the first seal biases away from the second seal to seal the gap.

In another aspect of the present disclosure, a method of sealing a dynamic gap using a seal apparatus, the seal apparatus comprising: a first seal or a flap arm having a first proximal end portion, a first distal end portion with a first bend, and a first skirt extending away from the first bend; a second seal or a wall arm opposite the first seal and defining an interior space therebetween, the second seal having a second distal end portion and a second proximal end portion coupled to the first proximal end portion, the first skirt extending into the interior space; and a support associated with the second seal, the support being disposed in the interior space, wherein the first seal biases away from the second seal, comprises: contacting at least two surfaces with the first distal end portion and the second distal end portion; and moving automatically at least the second distal end portion relative to one of the at least two surfaces in response to the gap changing size.

These and other features, aspects, and advantages of the present disclosure and/or embodiments will become better understood with reference to the following description and appended claims. The accompanying drawings, which are incorporated in and constitute a part of this specification illustrate embodiments of the present disclosure and, together with the description, serve to explain the principles of the present disclosure.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
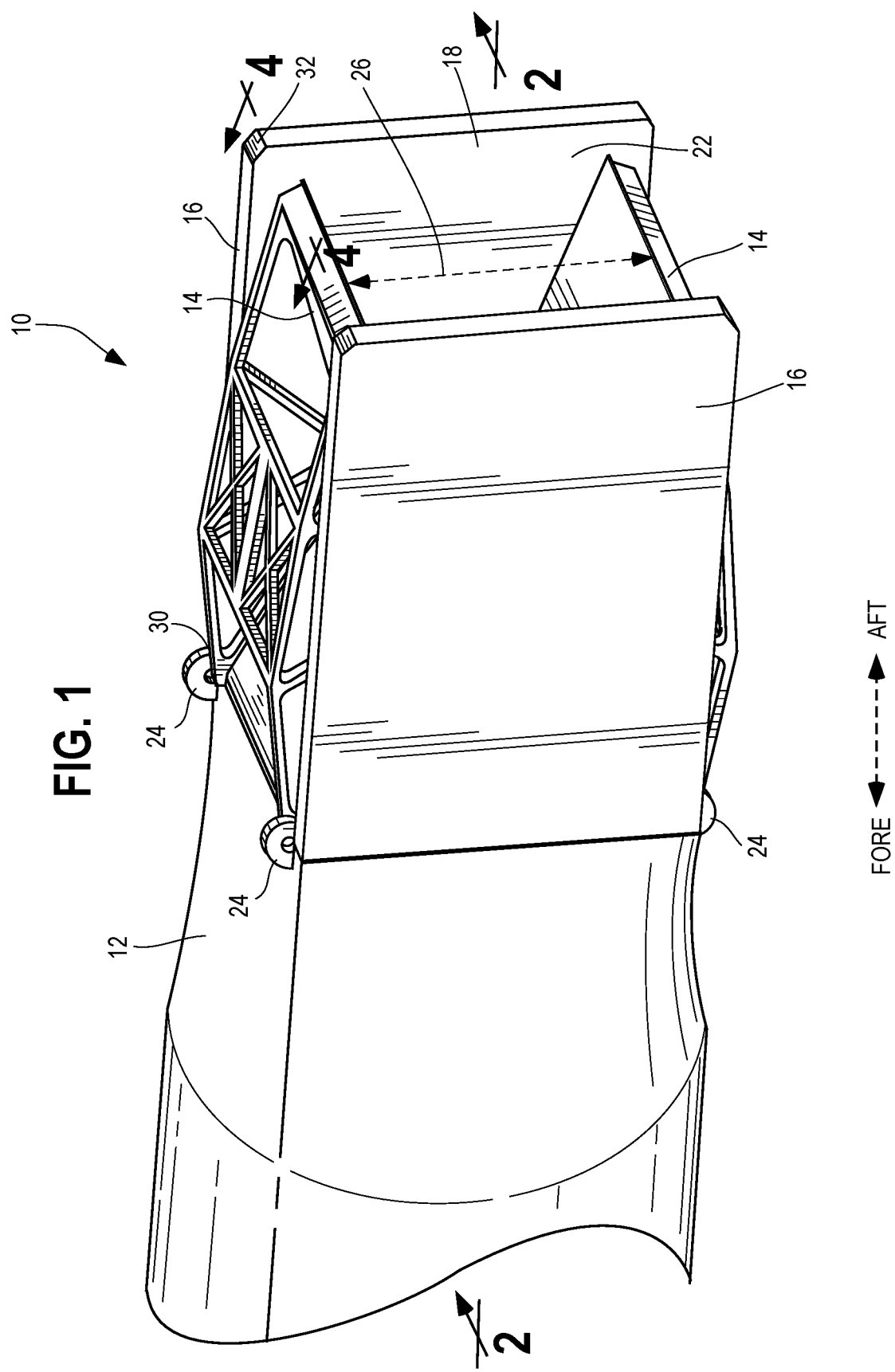
FIG. 1 is a perspective view of an exemplary gas turbine engine exhaust nozzle assembly, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To reduce the size of gaps between the flap and the nozzle sidewalls and to seal core air within the nozzle core, a seal assembly may be positioned between the nozzle flap and sidewall. In some instances, liners may be mounted to the nozzle sidewalls via one or more hangar structures. When the nozzle sidewall includes a liner, a seal assembly may be positioned between the flap and the sidewall liner, such that the seal seals against the sidewall liner rather than directly to the nozzle sidewall.

During operation of the nozzle, the flap may move in one or more directions relative to the nozzle sidewall. Thus, the seal assembly for the gap between the flap and the nozzle sidewall may need to facilitate sliding motion. For example, the seal assembly may need to facilitate the sliding of the seal assembly along the nozzle sidewall while still maintaining a seal between the nozzle flap and sidewall.

In addition to accommodating sliding motion along the sidewall, the seal assembly may also need to accommodate dynamic variations in the size of the gap between the nozzle flap and sidewall and/or liner. For example, the sidewall liner may distort due to pressure and temperature variations within the nozzle. In addition, although generally stationary, the nozzle sidewall may also deflect or shift towards or away from the flap. Such distortions may impact the size of the gap between the flap and the nozzle sidewall and/or the liner. Accordingly, the seal assembly may need to accommodate for variations in the size of the gap between the flap and the nozzle sidewall and/or the liner. Further, the seal assembly may need to conform to the nozzle sidewall and/or liner when the nozzle sidewall and/or the liner, or portions thereof, distort or move.

Leaf seals may be used to seal the gap between the nozzle flap and the sidewall and/or the liner. The use of leaf seals over other types of seals is sometimes dictated by their unique low width to height form factor, fitting in narrow but tall spaces where other seals like plunger seals cannot fit. However, leaf seals may expose structure behind the seal to core air, as pressure gradients in the nozzle may drive core air into the cavity behind the leaf. In some cases, this may require purge air and use of additional shielding and/or baffling to protect the structure and hardware behind the leaf. Similarly, when the leaf seal includes a skirt to discourage core air entrainment behind the leaf, attempts to seal the skirt itself may add additional smaller and more sensitive seals that still must cope with high thermal variation, relative motion, acoustic, and pressure loads. These secondary seals must perform in a similar environment and to similar motion requirements as the primary leaf seal, while typically having less space to do so. In addition, a skirt typically results in decreased compliance of the primary sealing interface by stiffening a tip of the leaf.

Therefore, there remains a desire to have a dynamic leaf seal that more effectively and efficiently controls or prohibits core air from flowing both to the ambient environment at the nozzle and into the structure of the dynamic leaf seal itself, while minimizing the weight, performance loss, or hardware complexity involved in adding secondary seals and/or purge air.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

With reference to FIGS. 1-4, there is illustrated a gas turbine engine 12 that produces core air flow. At the aft of the gas turbine engine 12 is a nozzle assembly 10 to control the effect of the discharged core air. The nozzle assembly 10 includes upper and lower flaps 14 mounted for movement relative to one another between two opposing corresponding sidewalls 16. A gap 42 is located between outer edges of the flaps 14 and the corresponding sidewalls 16. This gap 42 would allow air to exhaust inefficiently to the ambient surroundings without seals. As illustrated in FIGS. 5-15, there is a skirted leaf seal 50 that controls or even prevents this core air from exhausting to the surrounding. The skirted leaf seal 50 includes a flap arm 52 that engages the flap 14 and a wall arm 54 that engages the sidewall 16. The skirted leaf seal 50 is resilient such that the flap arm 52 and the wall arm 54 bias away from one another when pre-loaded in the gap 42. The skirted leaf seal 50 further includes a support arm 90. Ends 68, 93 of the flap arm 52 and the support arm 90 cooperate to control or prevent core air from entering an interior space 72 between the arms 52, 90. The resilient nature of the skirted leaf seal 50 allows the arms 52, 54 to adapt to distortion in the gap 42 created by the sidewalls 16 or liners 18 attached to the sidewalls 16 via hangers 20.

Turning back to FIG. 1, the gas turbine engine 12 discharges exhaust gases, also referred to as core air, into the nozzle assembly 10. The nozzle assembly 10 may include one or more flaps 14 and one or more sidewalls 16. In this exemplary embodiment, the nozzle assembly 10 includes two opposing, flat nozzle sidewalls 16 and two opposing flaps 14. In some embodiments, one or more of the sidewalls 16 further include a liner 18 mounted to the sidewall via one or more hangers 20. The flaps 14 may be moveable relative the sidewalls 16, which may be generally stationary. By some approaches, the flaps 14 may be pivotally supported by the gas turbine engine 12 at the fore end 30 of the nozzle assembly 10. The flaps 14 may be pivotally supported, for example, by rotating means such as hinges 24 that couple the flaps 14 to the gas turbine engine 12.

The flaps 14 and sidewalls 16 define a nozzle core 22 that bounds core air exiting the gas turbine engine 12. Core air from the gas turbine engine 12 flows through the nozzle core 22 to create thrust for the gas turbine engine 12. Core air may flow through the nozzle core 22 from a fore end 30 to an aft end 32 of the nozzle assembly 10. The aft end 32 of the nozzle assembly 10 defines a generally rectangular outlet 26 for discharging core air from the nozzle assembly 10 to the ambient environment. In some approaches, the flaps 14 are movable to direct the flow and pressure of core air within the nozzle core 22. For example, the flaps 14 may be vertically movable to adjust the size of the outlet 26 of the nozzle assembly 10.

Figure 2:
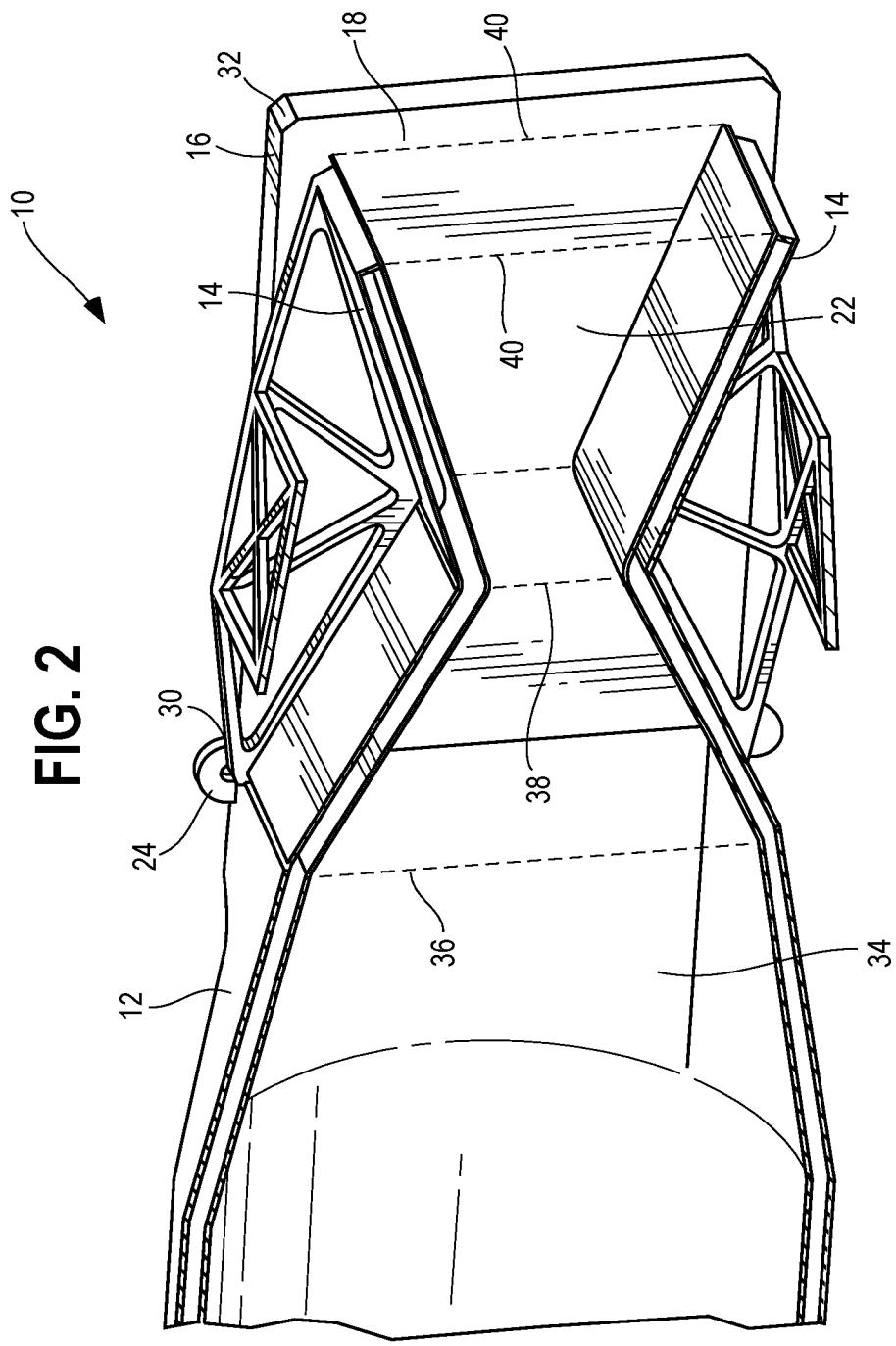
FIG. 2 is a cross-sectional view of the nozzle assembly of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. As shown in FIG. 2, in some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core 22 includes a first cross-sectional area 36, a second cross-sectional area 38, and a third cross-sectional area 40. The flaps 14 control the size of the second cross-sectional area 38 and the third cross-sectional area 40.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 40.

Figure 3:
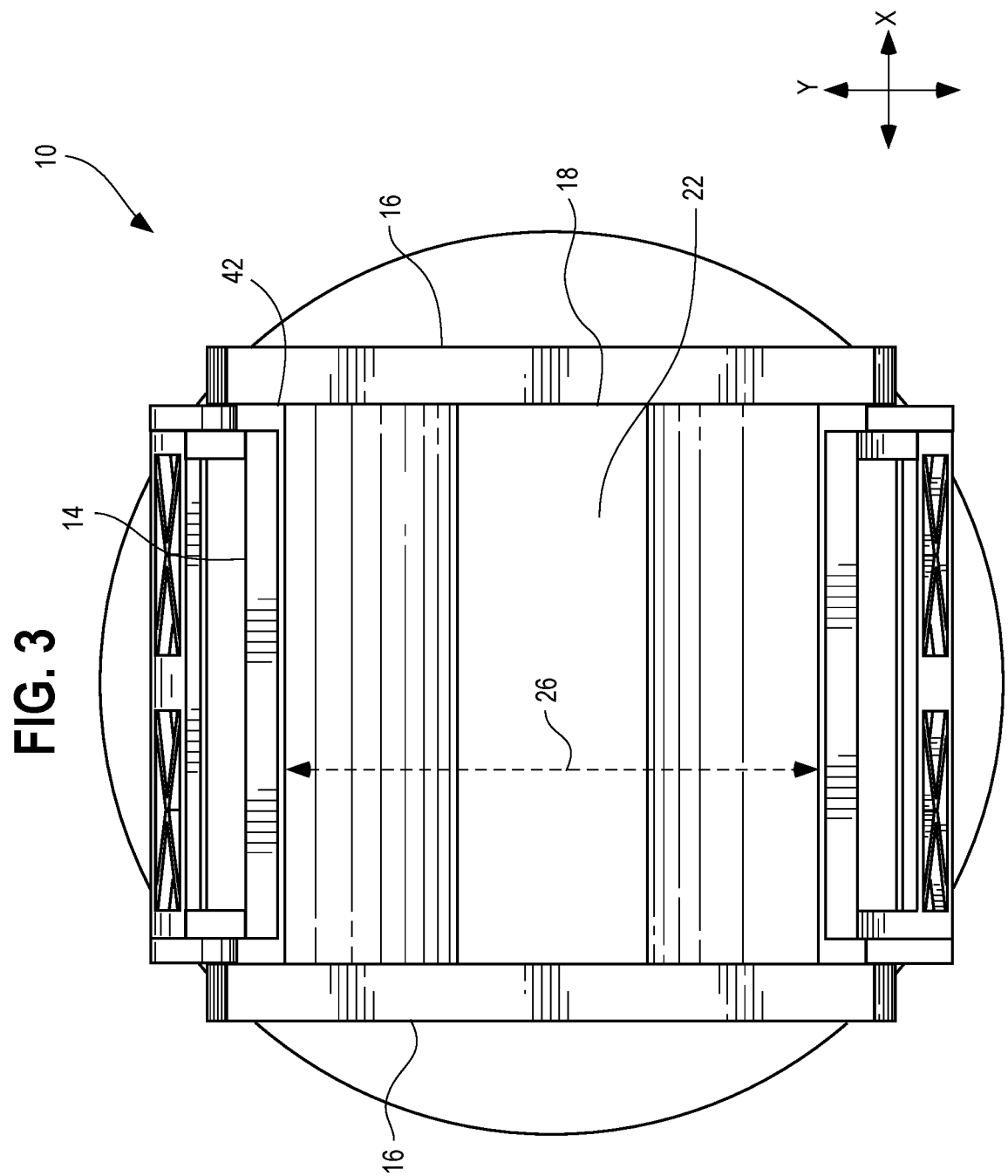
FIG. 3 is an end elevation view of the nozzle assembly of FIG. 1 taken from an aft end of the nozzle assembly.

Turning to FIG. 3, a gap 42 between the flap 14 and the sidewall 16 extends along the length of the flap 14 (i.e., from the fore end 30 to the aft end 32 of the nozzle assembly as shown in FIG. 1). The gap 42 may be continuous or interrupted at one or more locations. The size of the gap 42 may vary dynamically during operation of the nozzle assembly 10. During operation, the flaps 14 may move along the Y-direction shown in FIG. 3. This motion of the flaps 14, for example, varies the size of the outlet 26 of the nozzle assembly 10. Additionally, during operation, the sidewall 16 may shift along the X-direction shown in FIG. 3. For example, the pressure of core air in the nozzle core 22 may urge the sidewall 16 away from the flap 14, increasing the size of the gap 42. Accordingly, the gap 42 may be narrower when the nozzle core 22 is at atmospheric pressure than when the nozzle core 22 receives engine core air during operation of the nozzle assembly 10. In addition to motion of the sidewall 16, the liner 18 of the sidewall 16 may also distort during operation, causing the liner 18 to shift along one or more of the X-direction and Y-direction. Such liner distortion may occur, for example, due to changes in temperature and pressure along the nozzle core 22. A skirted leaf seal assembly 44 (not shown in FIG. 3) is installed in the gap 42 between the flap 14 and the sidewall 16. In some embodiments the skirted leaf seal assembly 44 is the skirted leaf seal assembly 80 depicted in FIGS. 11 and 12.

Figure 4:
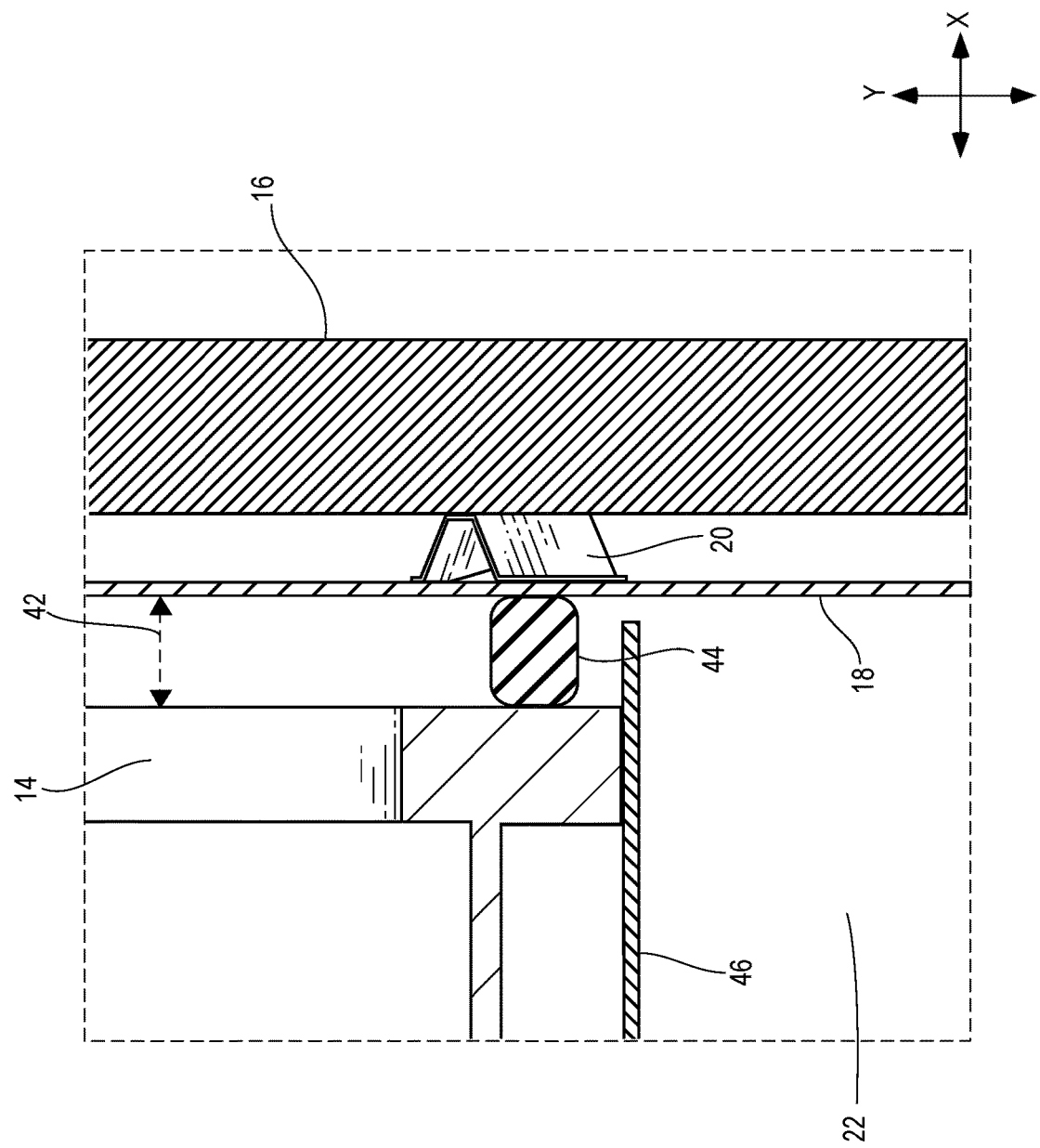
FIG. 4 is an enlarged, cross-sectional view, taken along line 4-4 in FIG. 1 of a portion of the nozzle assembly of FIG. 1.

With reference to FIG. 4, the gap 42 extends generally between the flap 14 and the sidewall 16. In the nozzle assembly 10, the sidewall 16 includes a liner 18, which is mounted to the sidewall 16 via hangers 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42.

The nozzle assembly 10 includes a skirted leaf seal assembly 44 positioned in the gap 42. The skirted leaf seal assembly 44 bridges the gap 42 between the flap 14 and the sidewall 16 to seal the gap 42 and reduces the size of the gap 42. In this manner, the skirted leaf seal assembly 44 reduces the flow of core air from the nozzle core 22 through the gap 42 which may decrease or effect the flow of core air from the nozzle core 22 to the ambient environment surrounding the nozzle assembly 10. In some embodiments, the skirted leaf seal assembly 44 includes a skirted leaf seal, such as the skirted leaf seal 50 depicted in FIGS. 5-15.

Figure 5:
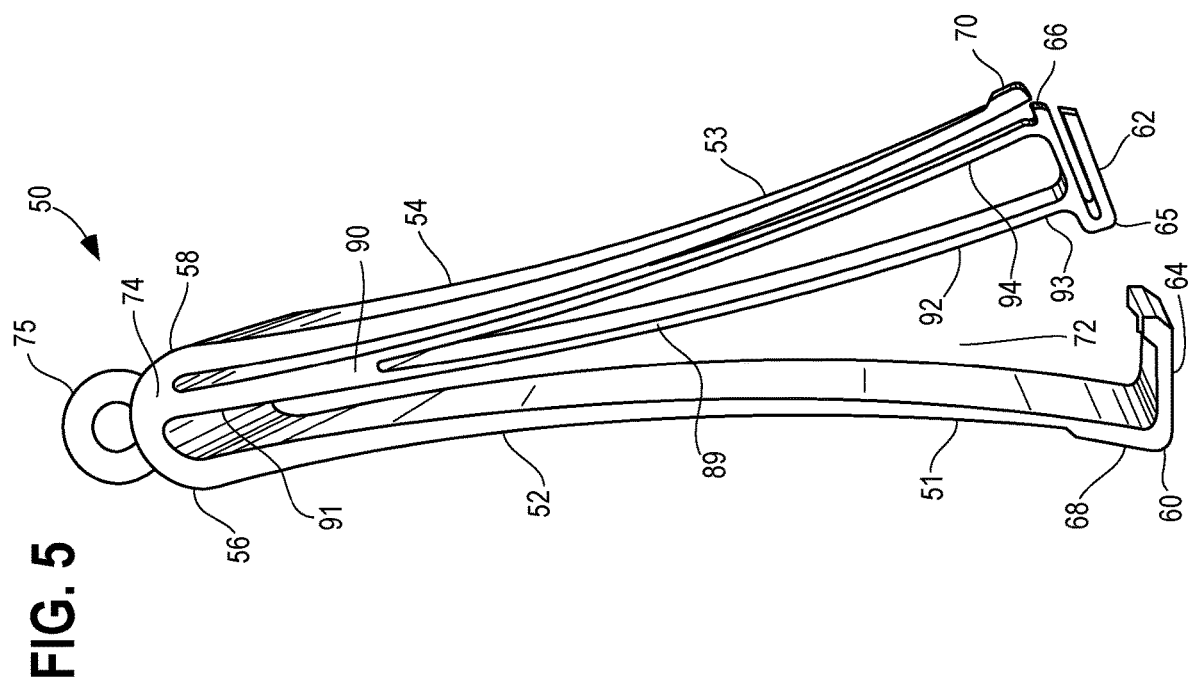
FIG. 5 is a perspective view of a dynamic skirted leaf seal, in accordance with some embodiments.
Figure 6:
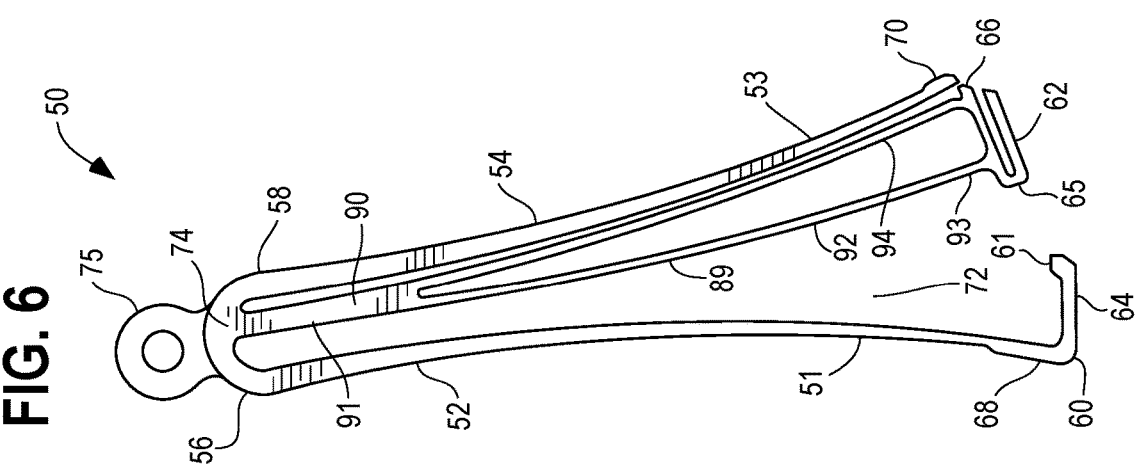
FIG. 6 is a front elevation view of the seal of FIG. 5.
Figure 11:
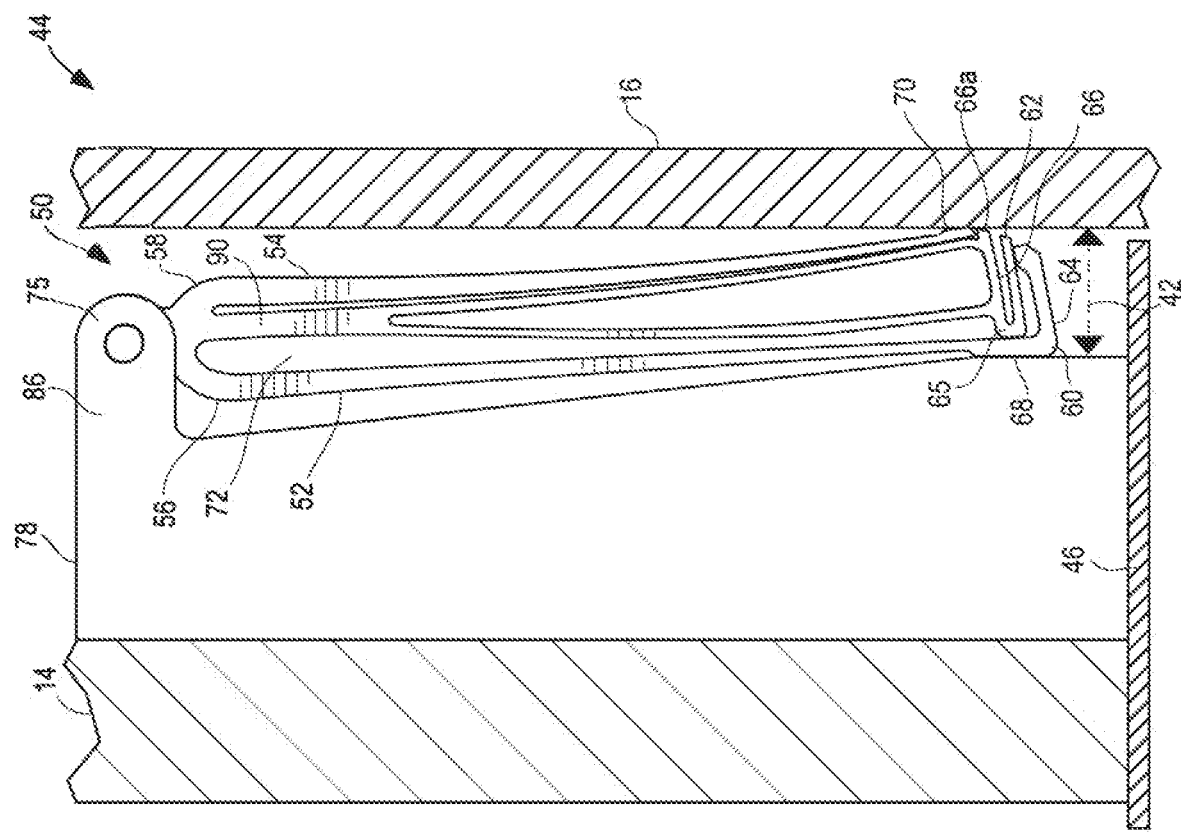
FIG. 11 is a front, side elevation view of a skirted leaf seal assembly including the seal of FIG. 5 showing the seal in a fully compressed state.
Figure 12:
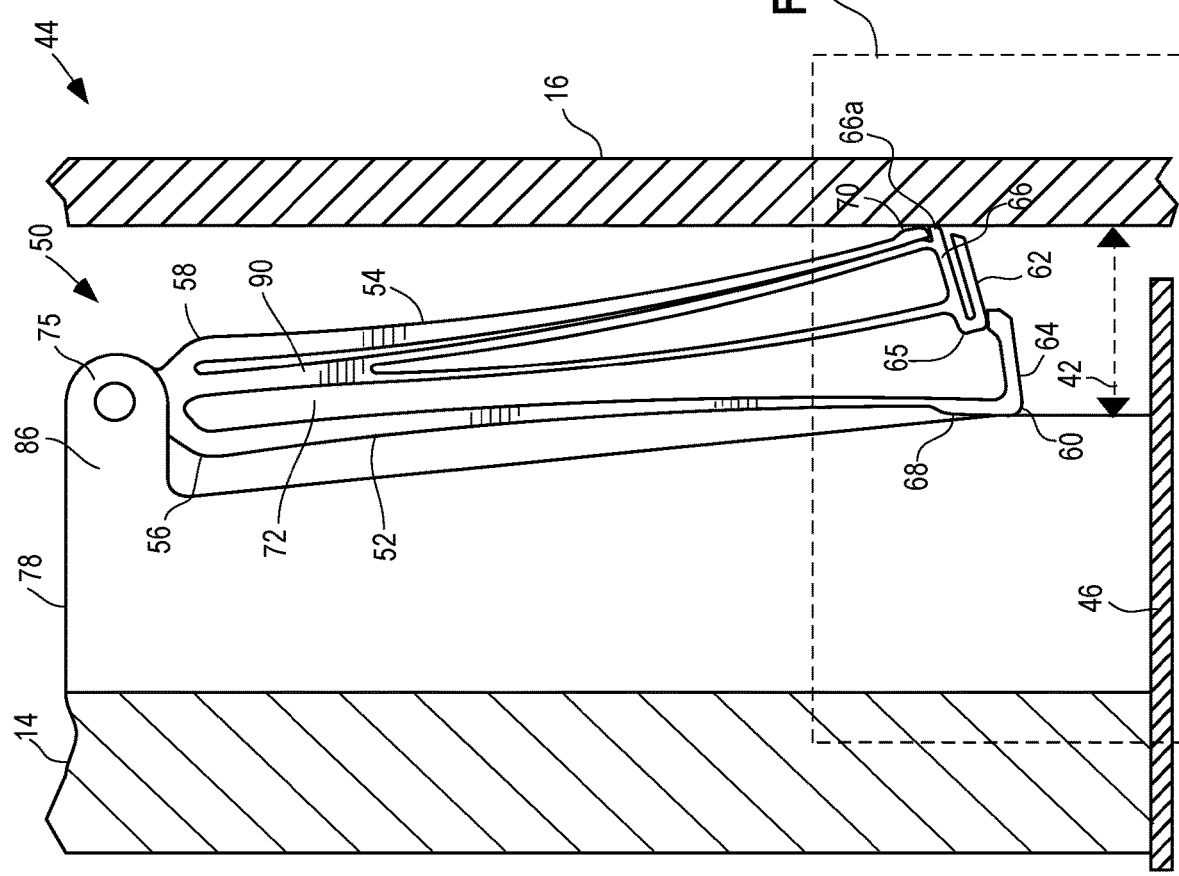
FIG. 12 is a front, side elevation view of a skirted leaf seal assembly including the seal of FIG. 5 showing the seal in a further expanded state.
Figure 13:
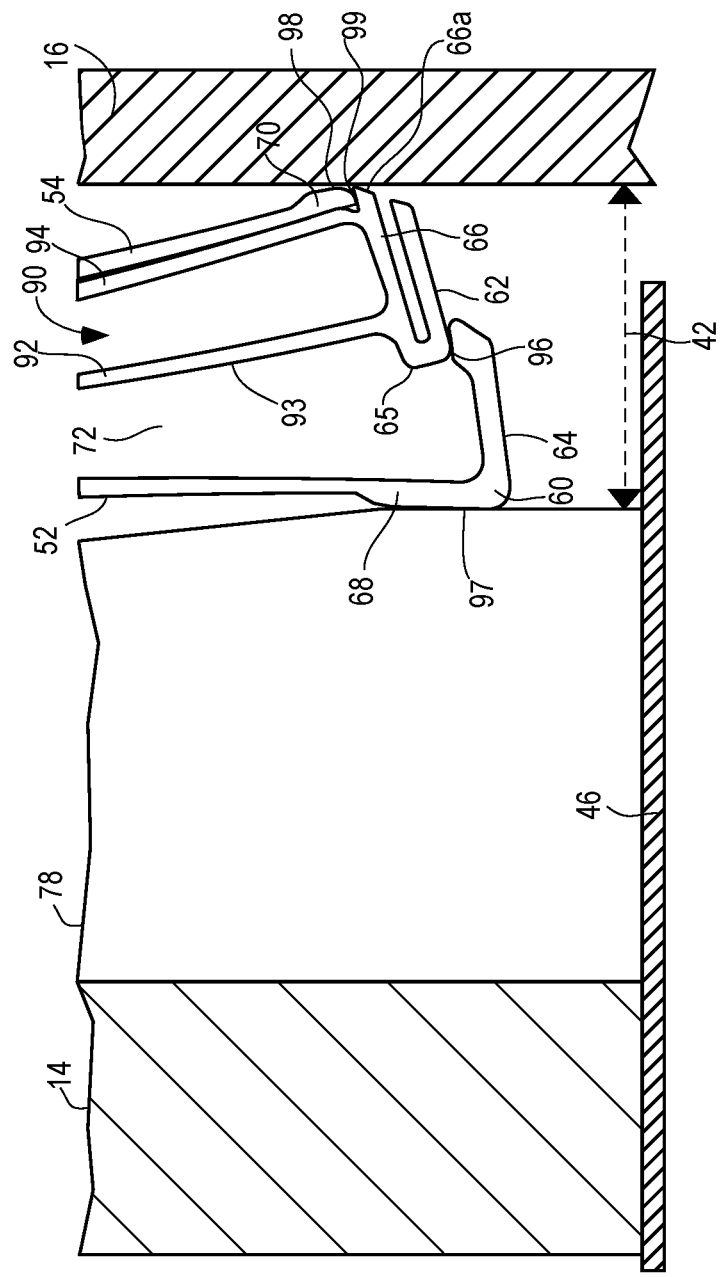
FIG. 13 is an enlarged elevation view of the skirted leaf seal assembly of FIG. 12.

As shown in FIGS. 5 and 6, the skirted leaf seal 50 may be a spring or a flexible, elastic device used to store mechanical energy. The skirted leaf seal 50 may be resilient so that, when pre-loaded in a gap, the skirted leaf seal 50 exerts an outward resilient force. FIGS. 11-13 show the skirted leaf seal 50 may be pre-loaded in the gap 42. In FIGS. 5 and 6, the skirted leaf seal 50 is depicted in a free state, that is, without any compression or load being applied to the seal.

The skirted leaf seal 50 includes a flap arm 52 and a wall arm 54. The flap arm 52 is positioned opposite the wall arm 54 and spaced from the wall arm 54. Together, the flap arm 52 and the wall arm 54 define an interior space 72 of the skirted leaf seal 50. The interior space 72 is bounded by the flap arm 52 and the wall arm 54. The skirted leaf seal 50 is resilient such that the flap arm 52 and the wall arm 54 bias away from one another when pre-loaded in the gap 42. In some embodiments, the flap arm 52 and the wall arm 54 are flexurally related such that they constrain the movement of the first skirt 64 and the second skirt 66 to specific degrees of freedom.

The flap arm 52 includes a proximal end portion 56, a distal end portion 68, and an intermediate portion 51 extending between the proximal end portion 56 and the distal end portion 68. The proximal end portion 56 is adjacent a housing or stationary structure to which the skirted leaf seal 50 is mounted, for example via an attachment member 75. The distal end portion 68 may be free to flex or move inward, for example when an external force is applied to the flap arm 52 at the distal end portion 68. The intermediate portion 51 may, in some forms, be concave or bend inwardly towards the interior space 72. The flap arm 52 may be an elongate sheet or leaf having a thickness 57. In some embodiments, the thickness 57 of the flap arm 52 may be greater at a proximal end portion 56 than at the distal end portion 68 of the flap arm 52. In certain embodiments, the thickness 57 of the flap arm 52 may gradually decrease from the proximal end portion 56 to the distal end portion 68. The decrease may be consistent or variable. The distal end portion 68 of the flap arm 52 includes a first bend area 60.

When installed in the gap 42 (see FIGS. 11 and 12), a compressive load is applied to the distal end portion 68 of the flap arm 52. The flap arm 52 has a radius of curvature that causes the distal end portion 68 to protrude outwardly further than the intermediate portion 51. In this manner, the distal end portion 68 provides a determinate contact area for the flap 14, the housing 78, or another surface, to press against. This results in a determinate seal flexure. In some embodiments, the distal end portion 68 may further include one or more additional stocks or lands to further extend the distal end portion 68 beyond the intermediate portion 51. The additional stocks or lands may be used to compensate for the shape of the intermediate portion 51 or to provide additional wear-resistance.

The first bend area 60 is coupled to a first skirt 64. The first skirt 64 extends away from the first bend area 60 to form in part the interior space 72 of the skirted leaf seal 50. It is preferred that the bend (at the first bend area 60) between the first skirt 64 and the distal end portion 68 position first skirt 64 closest to the radiation shield 62. The preferred bend angle between the first skirt 64 and the distal end portion 68 would thus tend to be around 90 degrees or acute. Even further preferably, the first bend area 60 may position the first skirt 64 at an angle of about 45 to about 90 degrees relative to the flap arm 52 and, in some approaches, about 75 to about 90 degrees relative to the flap arm 52.

In some embodiments, the first skirt 64 of the flap arm 52 may further include a lip portion 61. The lip portion 61 may be a projection extending along a width of the first skirt 64. The lip portion 61 may be on a side of the first skirt 64 adjacent the interior space 72 and may be present anywhere along the first skirt 64, however, as shown in FIGS. 5 and 6, the lip portion 61 is disposed on the tip of the first skirt 64. Further, while only shown on the first skirt 64, a lip portion 61 may also be included on the second skirt 66 or a radiation shield 62 of the support arm 90.

The wall arm 54 includes a proximal end portion 58, a distal end portion 70, and an intermediate portion 53 extending between the proximal end portion 58 and the distal end portion 70. The proximal end portion 58 is adjacent a housing or stationary structure to which the skirted leaf seal 50 is mounted, for example via the attachment member 75. The distal end portion 70 is free to flex or move inward, for example when an external force is applied to the wall arm 54. The intermediate portion 53 may, in some forms, be concave or bend inwardly towards the interior space 72.

Figure 7:
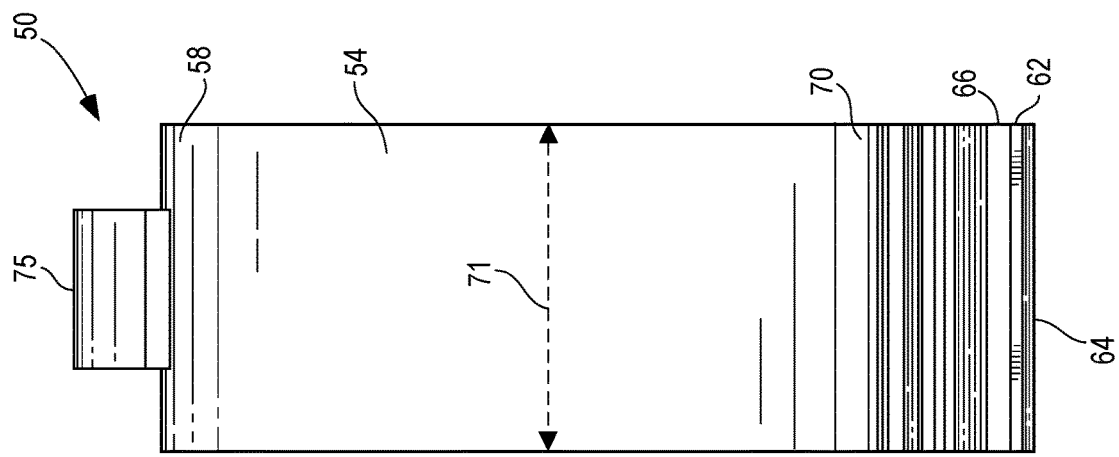
FIG. 7 is a right, side elevation view of the seal of FIG. 5.

In some approaches, the wall arm 54 may be shorter than the flap arm 52; that is, a distance from the proximal end portion 58 to the distal end portion 70 of the wall arm 54 may be less than a distance from the proximal end portion 56 to the distal end portion 68 of the flap arm 52. However, it is also contemplated that the wall arm 54 may be longer than the flap arm 52. The wall arm 54 may be an elongate sheet or leaf having a thickness 59. FIG. 7 depicts a side view of the skirted leaf seal 50, illustrating the wall arm 54 comprising an elongate sheet. In some embodiments, the thickness 59 of the wall arm 54 may be greater at a proximal end portion 58 than at the distal end portion 70 of the wall arm 54. In certain embodiments, the thickness 59 of the wall arm 54 may gradually decrease from the proximal end portion 58 to the distal end portion 70. The decrease may be consistent or variable. In some embodiments, the distal end portion 70 may be enlarged to have a thickness greater than a thickness of the intermediate portion 53.

When installed in the gap 42 (see FIGS. 11 and 12), a compressive load is applied to the distal end portion 70 of the wall arm 54. The wall arm 54 has a radius of curvature that causes the distal end portion 70 to protrude outwardly further than the intermediate portion 53. In this manner, the distal end portion 70 provides a determinate contact area for the sidewall 16, or another surface, to press against. This results in a determinate seal flexure. In some embodiments, the distal end portion 70 may further include one or more additional stocks or lands to further extend the distal end portion 70 outwardly beyond the intermediate portion 53. The additional stocks or lands may be used to compensate for the shape of the intermediate portion 53 or to provide additional wear-resistance.

The proximal end portion 56 of the flap arm 52 is coupled to the proximal end portion 58 of the wall arm 54. A connecting portion 74 couples the proximal end portion 56 of the flap arm 52 to the proximal end portion 58 of the wall arm 54. In some embodiments, the connecting portion 74 is generally U-shaped. In this manner, the connecting portion 74 may orient the flap arm 52 and the wall arm 54 to form a hairpin-shape. In some forms, the connecting portion 74 couples the proximal end portion 56 of the flap arm 52 to the proximal end portion 58 of the wall arm 54. In some embodiments, the connecting portion 74 enables the flap arm 52 and the wall arm 54 to collapse flat or parallel upon full compression; that is, to be configured with the leaf seal having a generally constant width between the flap and the sidewall, as seen in FIG. 11 for example.

In some forms, a distance between the proximal end portion 56 of the flap arm 52 and the proximal end portion 58 of the wall arm 54 may be shorter than a distance between the distal end portion 68 of the flap arm 52 and the distal end portion 70 of the wall arm 54 when the skirted leaf seal 50 is in a free state. In some embodiments, the flap arm 52 and the wall arm 54 are formed of a monolithic, or single, piece of material. A monolithic construction may simplify manufacturing of the skirted leaf seal 50, for example, by eliminating or reducing the need for riveting, brazing, or welding in the seal. Monolithic, as used herein, refers to a unitary structure lacking interfaces or joints by virtue of the materials of each layer fusing to or melting with the materials of adjacent layers such that the individual layers lose their identity in the final unitary structure.

In some embodiments, when the skirted leaf seal 50 is in a free state as shown in FIGS. 5 and 6, the first skirt 64 and the second skirt 66 may not be in contact and/or may not overlap. However, when the flap arm 52 and the wall arm 54 are constrained such as within the gap 42, by way of non-limiting example, the flap arm 52 may engage or overlap with the wall arm 54. It is contemplated that the connecting portion 74 may relate external forces applied to one or more of the flap arm 52 and wall arm 54. Forces may be applied to one or more of the flap arm 52 and wall arm 54, for example, when the skirted leaf seal 50 is installed in a gap such as the gap 42 between the flap 14 and the sidewall 16 depicted in FIGS. 11 and 12.

The skirted leaf seal 50 further includes a support arm 90. In the embodiments shown in FIGS. 5-15, the skirted leaf seal 50 includes one support arm 90. However, in other non-limiting examples, the skirted leaf seal may include more than one support arm 90. The support arm 90 is disposed in the interior space 72 between the flap arm 52 and the wall arm 54. The support arm 90 includes a proximal end portion 91, a distal end portion 93, and an intermediate portion 89 extending between the proximal end portion 91 and the distal end portion 93. The distal end portion 93 is free to flex or move inward, for example when an external force is applied to the wall arm 54. The proximal end portion 91 of the support arm 90 may be coupled to one or more of the flap arm 52 and the wall arm 54. In some embodiments, such as the embodiment depicted in FIGS. 5 and 6, the proximal end portion 91 of the support arm 90 is coupled to the connecting portion 74 of the skirted leaf seal 50.

The distal end portion 93 of the support arm 90 may include a first support or first resilient sheet 92 and a second support or second resilient sheet 94. The second resilient sheet 94 is spaced from and opposite the first resilient sheet 92. The intermediate portion 89 of the support arm 90 may be bifurcated, branching into the first resilient sheet 92 and the second resilient sheet 94. Accordingly, the first resilient sheet 92 and second resilient sheet 94 may extend through the intermediate portion 89 to the distal end portion 93 of the support arm 90. In some forms, the support arm 90 or portions thereof may be a sheet or leaf. The support arm 90 is resilient such that support arm 90 biases away from the flap arm 52 and towards the wall arm 54 when pre-loaded in the gap 42.

In some configurations, the first resilient sheet 92 is positioned adjacent to the flap arm 52 and the second resilient sheet 94 is positioned adjacent to the wall arm 54. The distal end portion 93 of the support arm 90 further includes a second skirt 66 extending between the first resilient sheet 92 and the second resilient sheet 94. The first resilient sheet 92 and the second resilient sheet 94 cause the second skirt 66 to move predictably, in a manner that is flexurally related to the load applied to the second skirt 66 by the distal end portion 70 and the intermediate portion 53 of the wall arm 54.

The skirted leaf seal 50 may be pre-loaded to urge the support arm 90 towards the wall arm 54. In this manner, the support arm 90 supports the wall arm 54, for example, when the skirted leaf seal 50 is under compression. Additionally, loading the support arm 90 against the wall arm 54 may also provide vibration resistance and torsion resistance when the distal end portion 70 of the wall arm 54 is subjected to external forces, for example due to shifting or motion in a structure adjacent the wall arm 54 (e.g., the sidewall 16 in FIGS. 11 and 12).

In some embodiments, the distal end portion 93 of the support arm 90 may further include a radiation shield 62. The radiation shield 62 is an optional component of the skirted leaf seal 50. When the radiation shield 62 is not included, the second skirt 66 of the support arm 90 is adjacent the first skirt 64 when the skirts 64, 66 are lapped. Accordingly, the metered gap or edge of contact may be between the first skirt and the second skirt 66 and/or the radiation shield 62. The radiation shield 62 is attached to the second skirt 66 via a hairpin bend 65. The hairpin bend 65 orients or aligns the radiation shield 62 below the second skirt 66. It is contemplated that inclusion of the radiation shield 62 on the support arm 90 may protect sealing elements from heat. For example, when the skirted leaf seal 50 is installed in the nozzle assembly 10 depicted in FIGS. 1-4, the radiation shield 62 may help to protect the support arm 90 from heat from core air. Thus, when exposed to heat, the radiation shield 62 may distort rather than the second skirt 66, the first resilient sheet 92, and/or the second resilient sheet 94, which are disposed above the radiation shield 62. The shape of the radiation shield 62 and the hairpin bend 65 are designed to follow the relative trajectory of the second skirt 66 as the skirted leaf seal 50 is compressed or expanded.

Further, the shape of the second skirt 66 (and, when included, the radiation shield 62) and the first skirt 64 are shaped to maintain a consistent distance between the second skirt 66 (or radiation shield 62) and the first skirt 64 when the first skirt 64 and the second skirt 66 (or radiation shield 62) are overlapping. In some embodiments, when overlapping, the second skirt 66 (or radiation shield 62) and the first skirt 64 may be in contact. In other embodiments, when overlapping, the second skirt 66 (or radiation shield 62) and the first skirt 64 may be metered or tightly gapped.

The skirted leaf seal 50 further includes the attachment member 75. The attachment member 75 may be used to attach the skirted leaf seal 50 to a structure, such as the flap 14 or another structure. In some approaches, the attachment member 75 may attach the skirted leaf seal 50 directly to the flap 14 (see FIGS. 11 and 12) or other structure. In other approaches, the attachment member 75 may attach the skirted leaf seal 50 to the housing 78, the housing 78 being mounted on the flap 14 or another structure. As discussed in detail later (see FIGS. 11 and 12), in an exemplary attachment configuration, the skirted leaf seal 50 is attached to a housing 78 via the attachment member 75, which is associated with or mounted to the flap 14.

The attachment member 75 may be any mechanism suitable to attach or couple the skirted leaf seal 50 to a structure. In some embodiments, the attachment member 75 may hingedly or rotatably attach the proximal end of the skirted leaf seal 50 to a structure, such as the flap 14 or the housing 78. In this manner, the distal end portion of the skirt leaf seal 50 may rotate or pivot about the attachment member 75. The attachment member 75 may be, for example, a hinge comprising a knuckle and a pin, a resilient and/or flexural hinge, or through other rotationally coupled mechanisms. The attachment member 75, may operate to counteract pressure applied to the first and second skirts of the skirted leaf seal 50, for example, core pressure within a nozzle of a gas turbine engine engaging an outward facing surface of the first skirt 64 and the second skirt 66.

In some embodiments, the skirted leaf seal 50 may be made of any suitable metallic or ceramic materials or combinations thereof. Materials used to in the skirted leaf seal 50 may be selected to withstand the temperatures of hot engine core air that may be in contact with the skirt leaf seal 50, for example, when the skirted leaf seal is employed in a gas turbine engine nozzle assembly, such as the nozzle assembly 10 depicted in FIG. 1. Furthermore, faying surfaces or hot core air exposed surfaces may be coated to enhance seal corrosion capability, wear resistance, or other seal performance or durability properties. It is also contemplated that, in some embodiments, when the skirted leaf seal 50 is employed in a high temperature environment such as a gas turbine engine nozzle assembly, the skirted leaf seal 50, or portions thereof such as exterior or core-exposed surfaces, may not include viscoelastic materials such as rubber or polymers, as such materials may not be capable of withstanding high temperatures.

In some embodiments, the skirted leaf seal 50 or portions thereof may be made as a flexure component, that is a flexible element engineered to be compliant in specific degrees of freedom. For example, the flexure of the leaf seal arms 52, 54 causes the second skirt 66 and the first skirt 64 to move in a predictable manner by restricting, relating, and defining the degrees of freedom of their motion through the shape of the components. That is, the components of the skirted leaf seal 50 move and are related to each other through the bending and torsional strains inside each respective component. In this way, these components are flexurally related, and it is the flexural joints that constrain movement of the components as opposed to sliding movement.

Further, in this manner, the skirted leaf seal 50 may undergo deformation and/or motion in specific degrees of freedom when an external force is applied to the skirted leaf seal 50. The arms 52, 54, 90 of the skirted leaf seal 50 may be flexures that relate and restrict motion of the skirted leaf seal 50 to specific degrees of freedom such that an external force applied to the skirted leaf seal 50 is translated to predictable displacement or motion in the skirted leaf seal 50. The arms 52, 54, 90 restrict, relate, and define the degrees of freedom for the motion of the skirted leaf seal 50 to seal the gap 42. Further the arms 52, 54, 90 restrict, relate, and define the degrees of freedom for the motion of the first skirt 64 and the second skirt 66 to seal the interior space 72 within the skirted leaf seal 50.

Turning to FIG. 7, the wall arm 54 is an elongate sheet or leaf and, in some embodiments, is generally rectangular in shape. While not shown in FIG. 7, the flap arm 52 may be generally the same shape as the wall arm 54. However, it is also contemplated that the flap arm 52 and wall arm 54 may have different shapes or different widths 71 when viewed from the side. The first skirt 64 extends below the second skirt 66 and radiation shield 62. The width 71 of the seal or the width of the wall arm 54 and the flap arm 52 (not shown in FIG. 7) may vary. A structure having more deformations or variations in gap size may employ more seals 50 having a narrower width 71. Employing more seals 50 having a narrower width 71 may enable the wall arm 54 of the skirted leaf seal 50 to conform more closely to the shape of the structure and the gap. A structure having fewer deformations or variations in gap size may employ fewer seals 50 having a wider width 71.

Figure 8:
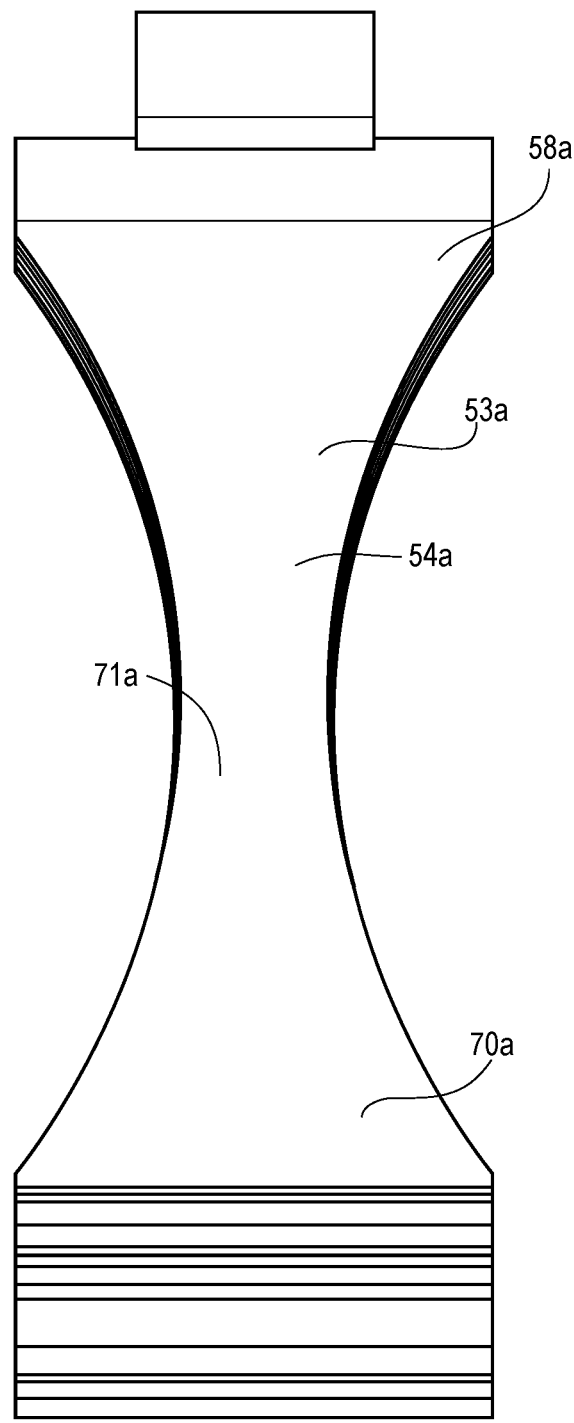
FIG. 8 is right, side elevation view of another embodiment of a skirted leaf seal.

Turning to FIG. 8, an alternative embodiment of the skirted leaf seal 50 is illustrated where the wall arm 54a is a shaped sheet or leaf. While not shown in FIG. 7, the corresponding flap arm 52a may be generally the same shape as the wall arm 54a. In this embodiment, the wall arm 54a is an hourglass shape. The proximal end portion 58a and the distal end portion 70a are wider than the intermediate portion 53a of the wall arm 54a.

Due to differences in shape, the arms 54, 54a in FIGS. 7 and 8 differ flexurally. The shape of the sheets impacts the compliance of the arms. The shaped arm 54a in FIG. 7, for example, is more compliant and free to twist than the arm 54 in FIG. 8. Including the cut-outs 69a or notches makes the arm 54a in FIG. 8 more compliant than the arm 54 in FIG. 7 and increases its freedom of motion as a flexure. The cut-outs or notches also change the stresses and reduce the force exerted by the arm 54a as compared to arm 54 when under compression. While the cut-outs 69a are shown along the edges of the arm 54a, it is contemplated that the cut-outs 69a may be positioned anywhere on the arm 54a and need not be adjacent the edge. Shaping the arm 54a for example via the cut-outs 69a, increases the torsional compliance of the arms 55a, and may help maintain an equal stress profile along the length of the arm 54a. Including one or more the cut-outs 69a or notches may also provide access windows to bolts, attachments, or other hardware hidden behind the body of the seal. It is contemplated that shaping, cutouts, and/or notches may also be included one or more of the wall arm, the flap arm, and the support arm of the seal.

It is contemplated that one or more skirted leaf seals 50 may be coupled together along a length (i.e., from a fore to an aft end) of a flap, such as the flap 14 in the nozzle assembly 10 of FIG. 1. One or more skirted leaf seals 50 may by directly coupled together or may be positioned adjacent each other along the length of the flap 14.

Figure 9:
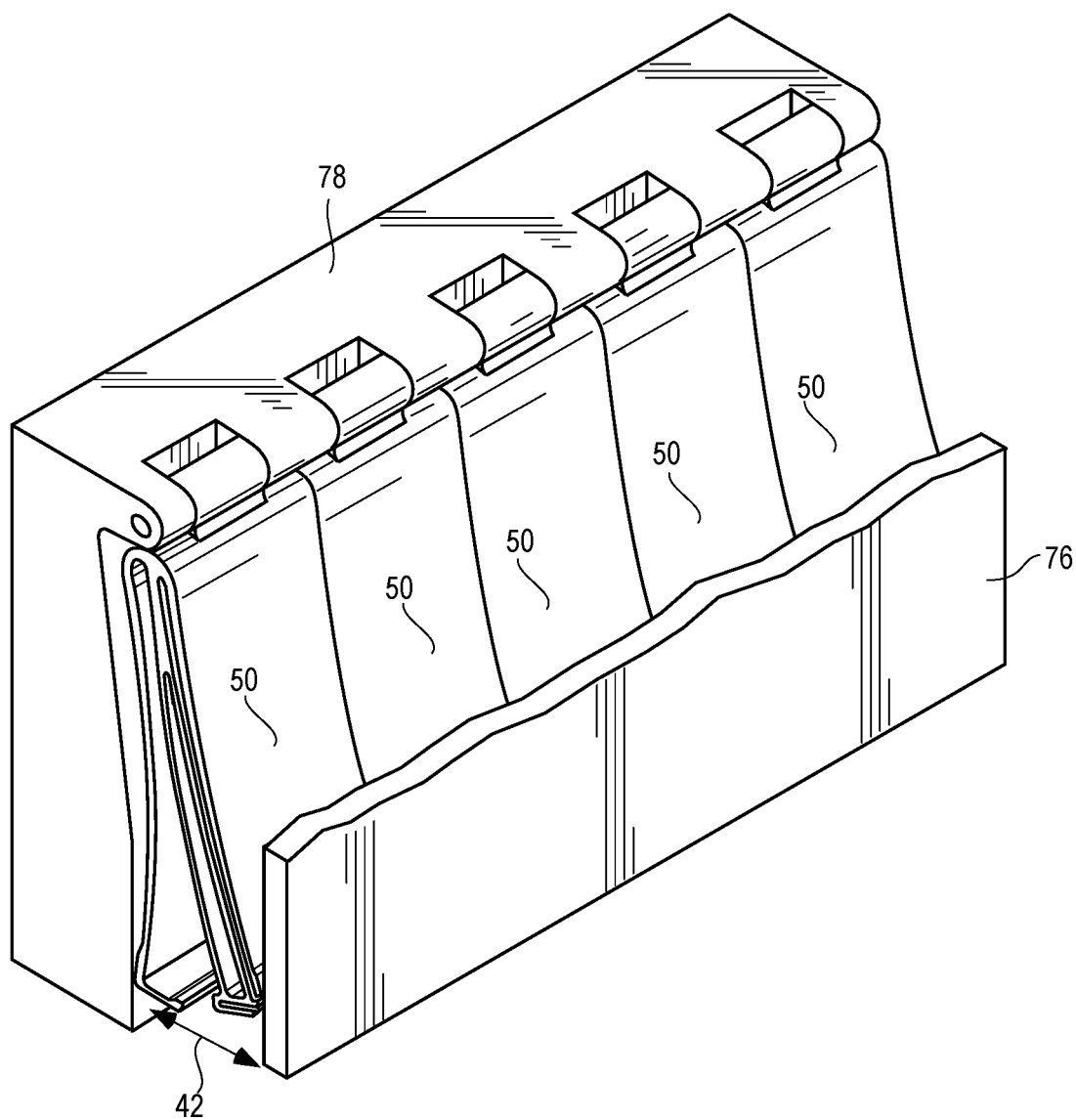
FIG. 9 is a perspective view of a series of the skirted leaf seals of FIG. 5 installed in an exemplary gap.

With reference to FIG. 9, a series of the skirted leaf seals 50 are shown installed in the gap 42 between the housing 78 and the sidewall 16. In some embodiments, the housing 78 is installed on the flap 14. It is also contemplated that the series of seals 50 may be affixed directly to the flap 14, without the separate housing 78. The seals 50 are butted to one another in series along the length of the housing 78.

Figure 10:
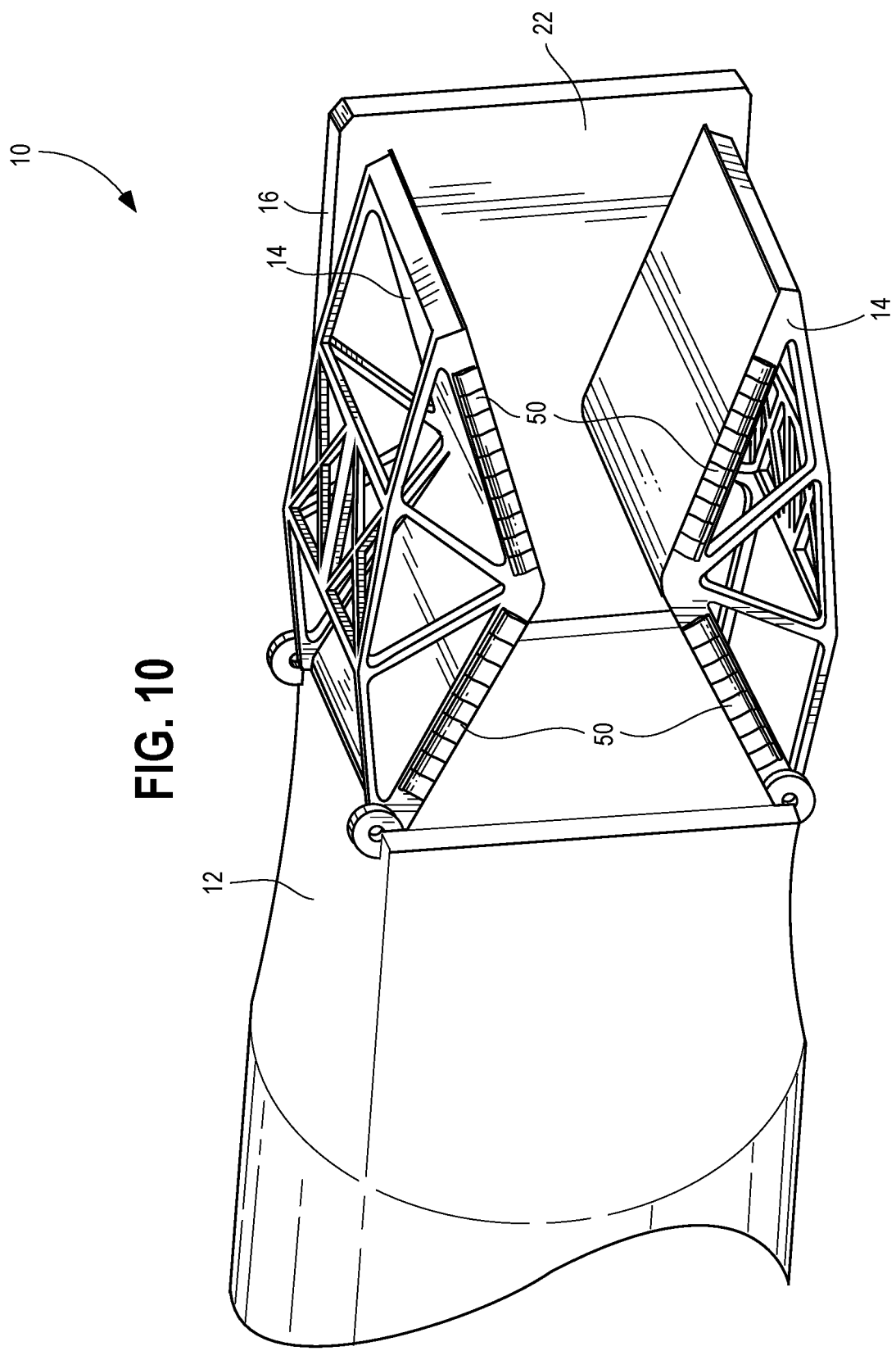
FIG. 10 is a perspective view of a series of the skirted leaf seals of FIG. 5 installed in the nozzle assembly of FIG. 1.

Illustrated in FIG. 10 is another an exemplary installation of a series of skirted leaf seals 50. The series of seals 50 is installed on the flap 14 of the nozzle assembly 10 depicted in FIG. 1. The seals 50 are butted or precisely spaced along the edge of the flap 14. It is also contemplated that the seals may be joined to one another using lapped joints or other labyrinthine features. Such lapped joints or labyrinthine features may be employed to discourage core air from bypassing the seals 50. As shown, the series of seals is installed linearly along the edge of the flap 14. No seals 50 are installed on the curved elbow of the flap 14. In some embodiments, two separate series of seals 50 may be joined by a separate transition seal at the curved elbow of the flap 14. Such transitions seals may be labyrinthine or intermediate seals to transition one linearly installed series of seals 50 to another linearly installed series of seals 50.

In some embodiments, one or more of the skirted leaf seals 50 may be installed in a gap between a movable flap and a stationary structure, such as gap 42 between the flap 14 and sidewall 16 of the nozzle assembly 10 of FIG. 1. When in installed in a gap, the skirted leaf seal 50 may exert a force to urge the flap arm 52 towards the movable flap 14 and to urge the support arm 90 and wall arm 54 towards the sidewall 16. In this manner, the skirted leaf seal 50 may be employed to seal the gap 42 between the movable flap 14 and the sidewall 16.

Turning to FIGS. 11 and 12, the skirted leaf seal 50 of FIGS. 5-7 is installed in the gap 42 between the flap 14 and the sidewall 16. In some embodiments, the flap 14 may be the flap 14 and the sidewall 16 may be the sidewall 16 of the nozzle assembly 10 of FIG. 1. The skirted leaf seal 50 is attached to the housing 78 in a seal assembly 44. In the embodiment shown in FIGS. 11 and 12, the housing 78 is mounted to the flap 14. However, it is also contemplated that the housing 78 may be integral with or part of the flap 14, such that the skirted leaf seal 50 is attached directly to the flap 14. The housing 78 may be mounted to the flap 14 via any suitable mounting mechanism, for example, by welding, nuts and bolts, or stud mounting. Although FIGS. 11 and 12 depict the flap arm 52 adjacent the flap 14 and the wall arm 54 adjacent the sidewall 16, this configuration may be reversed.

The flap 14 includes the flap liner 46. The skirted leaf seal 50 is sized such that the first skirt 64 is recessed behind the flap liner 46. In this manner, the first skirt 64 may be positioned adjacent to the sidewall 16 without concern for contacting the sidewall 16, which may be subject to motion or distortions although still generally considered a stationary structure. This configuration also reduces the area at the distal end of the skirted leaf seal 50 that is exposed to leakage from the nozzle core into the interior space 72 or to the ambient environment surrounding the skirted leaf seal 50.

The housing 78 may include a cantilever 86. The cantilever 86 projects away from the housing 78 into the gap 42 between the flap 14 and sidewall 16. In some embodiments, the cantilever 86 is positioned at an angle of about 90 degrees relative to the flap 14. The skirted leaf seal 50 is attached to the cantilever 86 via the attachment member 75. As discussed above, the attachment member 75 may hingedly or rotatably attach the skirted leaf seal 50 to the cantilever 86. In this manner, the attachment member 75 may allow the skirted leaf seal 50 to pivot or rotate about the cantilever 86. Thus, the distal end portion of the skirted leaf seal 50 may move towards or away from the sidewall 16, for example, to accommodate variations in the size of the gap 42.

When installed within the gap 42 as shown in FIGS. 11 and 12, the skirted leaf seal 50 is in a state of compression. The skirted leaf seal 50 or portions thereof are resilient such that the skirted leaf seal 50 has memory. Due to its resiliency, the skirted leaf seal 50 is able to spring back to its free state after being compressed. When in a state of compression, the skirted leaf seal 50 exerts a resilient force that urges the skirted leaf seal 50 to return to its free state. In a state of compression, the skirted leaf seal 50 is pre-loaded and creates an outward, resilient force. The resilient force biases the flap arm 52 away from the wall arm 54. The resilient force also biases the support arm 90 away from the flap arm 52 and towards the wall arm 54. To provide resiliency, the skirted leaf seal may be made from one or more resilient materials, such as superalloys or ceramic materials.

The forces exerted by the skirted leaf seal 50 are generated within the skirted leaf seal 50 by the flexing and/or compression of the skirted leaf seal 50 material. The loading of the flap arm 52 at the interface between the flap 14 and the flap arm 52 seals the space between the flap arm 52 and the flap 14 or, when present, the housing 78. Similarly, the loading of the wall arm 54 at the interface between the sidewall 16 and the wall arm 54 seals the space between the wall arm 54 and the sidewall 16. This interface loading is caused by the biasing of the arms 52, 54 is a result of the materials itself, the offset between the wall arm 54 and the flap arm 52, and the length, taper, and thickness of the arms, 52, 54.

The bias of the arms 52, 54, 90, and accordingly the force output, may be adjusted based on the mechanical relationship between the arms 52, 54, 90 and the relative length and thickness of the arms 52, 54, 90. Thickening and/or changing the length to thickness ratio of the arms 52, 54, 90 will increase the load between 54 and 90 for a given condition and helps with dampening vibrations. With respect to thickness, when the arms 52, 54, 90 are thicker, they may exert a greater force output and increase the preload requirements (i.e., requirements to compress the skirted leaf seal 50). Further, adjusting the thickness of the resilient sheets 92, 94 changes the bias and force output of the support arm 90 on the wall arm 54. Increasing the thickness of the resilient sheets 92, 94 may increase the force exerted by the support arm 90 on the wall arm 54 and may help the support arm 90 to better resist vibrations or pressure. The length to thickness ratio of the arms 52, 54, 90 determines the preload force exerted. In general, for a given length to thickness ratio, increasing the length increases the displacement or bias of the arms 52, 54, 90 while the spring rate generally stays constant. Increasing the length to thickness ratio softens the arms 52, 54, 90 and increases their displacement to yield. Decreasing the length to thickness ratio stiffens the arms 52, 54, 90 and reduces their displacement to yield.

Further, increasing the taper of the arms 52, 54, 90 stiffens the arms 52, 54, 90 and concentrates stresses towards the distal ends of the arms 52, 54, 90 and reduces stresses towards the proximal ends of the arms 52, 54, 90. The taper of the arms 52, 54, 90 depicted in FIGS. 5 and 6 approximates a profile in which each arm 52, 54, 90 is equally stressed along its length to increase material usage efficiency. In some approaches, the arms 52, 54, 90 may have a constant thickness with cut-outs 69*a* or shaping (as depicted in FIG. 8) to concentrate stresses and adjust the stiffness of the arms 52, 54, 90.

The connecting portion 74, in part, defines the mechanical relationship between the arms 52, 54, 90. The connecting portion 74 relates the movement of the arms 52, 54 such that loading the distal end portion 70 of the wall arm 54 causes both the flap arm 52 and the wall arm 54 to rotate about the attachment member 75. Loading one or more of the arms 52, 54, 90 causes the skirted leaf seal 50 to flex and rotate about the attachment member 75. Further, the proximal end portion 91 of the support arm 90 is affixed to the connecting portion 74 such that the support arm 90 will rotate with the attachment member 75.

The attachment member 75 provides a method of reacting frictional forces, locating the part, and interfacing with the flap 14 but does not change the operation of the skirted leaf seal 50 itself. As long as the compression load goes predominantly through the first bend area 60 and distal end portion 70, and the friction and pressure load is reacted out through the attachment member 75 for the first end area 60 with the others allowed to slide, the skirted leaf seal 50 functions optimally.

When pressure or a torsional force is exerted on the support arm 90 and/or the second skirt 66 which is affixed thereto, the resilient sheets 92, 94 may prevent or reduce rotation of the support arm 90. Adjusting the relative taper and thickness of the resilient sheets 92, 94 may increase or reduce the bias of the support arm 90 and/or the resistance to rotation of the support arm 90. The resilient sheets 92, 94 restrain the second skirt 66 to a path of movement that is defined, at least in part, by the proximal end portion 91 of the support arm 90. For example, the radius of curvature at the proximal end portion 91 of the support arm 90 may set the angle or position of the resilient sheets 92, 94 and, accordingly, defines the path of movement of the second skirt 66. Adjusting the angle or position of the resilient sheets 92, 94 relative to one another changes the path of movement of the second skirt 66. By defining the path of movement of the second skirt 66, the resilient sheets 92, 94 of the support arm 90 maintain the seal between the second skirt 66 and the first skirt 64 when the second skirt 66 is subjected to pressure of forces.

Further, the point where the proximal end portion 91 intersects the connecting portion 74 influences the motion of the second skirt 66. Moving the proximal end portion 91 towards the flap arm 52 causes the second skirt 66 to deflect more rapidly towards the wall arm 54 and, in particular, towards the distal end portion 70 of the wall arm 54. Moving the proximal end portion 91 towards the wall arm 54 causes the second skirt 66 to deflect more slowly towards the wall arm 54 and, in particular, towards the distal end portion 70 of the wall arm 54. In some embodiments, the proximal end portion 91 may be positioned on the connecting portion 74 such that the second skirt 66 is always loaded into the distal end portion 70 without overloading the arms 52, 54 when the skirted leaf seal 50 is in an extended, yet compressed, state when installed in the gap 42 (e.g., the skirted leaf seal 50 in FIGS. 12 and 13).

In a state of compression, the skirted leaf seal 50 exerts a force that urges the flap arm 52 and the wall arm 54 outward away from one another. As installed in the gap 42, the force may urge the flap arm 52 towards the flap 14 and may urge the wall arm 54 towards the sidewall 16. In this manner, the forces exerted by the skirted leaf seal 50 seals the gap 42 between the flap 14 and the sidewall 16.

FIG. 11 depicts the skirted leaf seal assembly 44 with the skirted leaf seal 50 in a fully compressed state. In FIG. 11, the sidewall 16, or a portion thereof, for example has shifted towards the flap 14, compressing the skirted leaf seal 50 and decreasing the size of the gap 42. In this state, the sidewall 16 may be in contact with the wall arm 54, and the housing 78 (or the flap 14) may be in contact with the flap arm 52. The distal end portion 70 of the wall arm 54 acts as a sealing surface with the sidewall 16 and the support arm 90 supports the wall arm 54 to provide torsion resistance. Further, in a fully compressed state, the second skirt 66 and/or the hairpin bend 65 may contact the flap arm 52.

FIG. 12 depicts the skirted leaf seal assembly 44 with the skirted leaf seal 50 in a further expanded state while installed in the gap 42. The skirted leaf seal 50 is further expanded but is still compressed relative to its free state. In FIG. 12, the sidewall 16, or a portion thereof, for example has shifted away from the flap 14, de-compressing the skirted leaf seal 50 and increasing the size of the gap 42. In this state, the sidewall 16 may be in contact with the wall arm 54, and the housing 78 (or flap 14) may be in contact with the flap arm 52. In the exemplary skirted leaf seal assembly 44 depicted in FIG. 12, the sidewall 16 may be in contact with distal end portion 70 of the wall arm 54, however, other portions of the wall arm 54 may be in contact with the sidewall 16 when the skirted leaf seal 50 is in a further expanded state.

Further, though not shown in contact with the sidewall 16 in FIG. 12, portions of the support arm 90 such as the second skirt 66 or radiation shield 62 may contact the sidewall 16. The distal end portion 68 and first bend area 60 of the flap arm 52 may be in contact with the housing 78 and, when no housing 78 is employed, may also be in contact with the flap 14. The second skirt 66 may include a skirt lip 66a adjacent to the sidewall 16. When in a state of compression, such as the state shown in FIGS. 11 and 12, the skirt lip 66a extends below the distal end portion 70 of the wall arm 54. In this manner, the skirt lip 66a seals the area behind the wall arm 54. In some approaches, the length of the skirt lip 66a is sized such that it does not unlap from the distal end portion 70 or wear unduly if it engages the sidewall 16. For example, a shorter skirt lip 66a may be more prone to unlap than a longer skirt lip 66a. The skirt lip 66a is sized such that it, in general, does not touch the sidewall 16. The distal end portion 70 of the wall arm 54, rather than the skirt lip 66a of the support arm 90, twists to conform to the sidewall 16. The length of the skirt lip 66a determines the maximum relative motion of the distal end portion 70 without unlapping from the skirt lip 66a. Therefore, based on the axial distortion requirement, the skirt lip 66a length, in part, determines the length of the skirted leaf seal 50.

In some approaches, the skirted leaf seal 50 may be sized to maintain overlap between the first skirt 64 and the radiation shield 62 and/or the second skirt 66 when the skirted leaf seal 50 is in an expanded state such as in FIG. 11. In this manner, the first skirt 64 remains in contact and/or maintains the metered gap with the second skirt 66 or, when included, the radiation shield 62. With respect to sizing the skirted leaf seal 50, the length of the flap arm 52 and the wall arm 54 may be adjusted to provide durability or to sufficiently seal the gap 42. For example, shorter arms 52, 54 may provide more durability than longer arms in applications subject to large amounts of motion in the flap 14 and/or the sidewall 16.

With reference to FIG. 13, the first skirt 64 of the flap arm 52 and the second skirt 66 and/or radiation shield 62 of the wall arm 54 are lapped at a distal end portion of the leaf seal assembly 44. In some embodiments, such as the embodiment shown in FIG. 13, the skirted leaf seal 50 may seal the gap 42 between the flap 14 and sidewall 16 via three surfaces or edges of contact 96, 97, 98.

The flap arm 52 may engage the radiation shield 62 of the support arm 90 at a first surface or edge of contact 96. In particular, the first skirt 64 of the flap arm 52 may engage the radiation shield 62 of the support arm 90 at the first edge of contact 96. In some embodiments, when the support arm 90 does not include a radiation shield 62, the first edge of contact 96 may be between the first skirt 64 and the second skirt 66. The first edge of contact 96 may prevent or reduce the flow of core air into the interior space 72 between the flap arm 52 and the wall arm 54.

The skirted leaf seal 50 resiliently relates the first skirt 64 to the second skirt 66. In some embodiments, the flap arm 52 may slidingly engage the wall arm 54 at the first edge of contact 96. By slidingly engaging the flap arm 52, the wall arm 54 may accommodate for variations in the size of gap 42. Further, such sliding engagement allows the first skirt 64 and the radiation shield 62 to move relative each other, for example, in response to movement, shifting, or other distortions in the sidewall 16.

The flap arm 52 may also engage the flap 14 at a second surface or edge of contact 97. In particular, the first bend area 60 of the flap arm 52 may engage the flap 14 at the first edge of contact 97. In some embodiments, such as the embodiment depicted in FIG. 13, the skirted leaf seal 50 may be mounted to the flap 14 via a housing 78. Accordingly, in some embodiments, the second edge of contact 97 may be between the flap arm 52 and the housing 78. However, it is also contemplated that, in other embodiments, the skirted leaf seal 50 may be mounted directly to the flap 14. In these other embodiments, the second edge of contact 97 may be between the flap arm 52 and the flap 14. The second edge of contact 97 may seal a space between the flap 14 and the flap arm 52. To create the second edge of contact 97, the skirted leaf seal 50 may exert a force that urges the flap arm 52 towards the flap 14.

One or more of the wall arm 54 and the support arm 90 may contact the sidewall 16 at a third surface or edge of contact 98. In particular, one or more of the distal end portion 70 of the wall arm 54 and the second skirt 66 may engage the sidewall 16 at the third edge of contact 98. Accordingly, in some embodiments, the third edge of contact 98 may be between a liner (e.g., the liner 18 of FIG. 4) and one or more of the wall arm 54 and the support arm 90. However, it is also contemplated that, in other embodiments, the stationary structure may not include a liner. In these other embodiments, the third edge of contact 98 may be directly between the sidewall 16 and one or more of the wall arm 54 and the support arm 90. The third edge of contact 98 may seal a space between the sidewall 16 and the skirted leaf seal 50. To create the third edge of contact 98, the skirted leaf seal 50 may exert a force that urges the wall arm 54 towards the sidewall 16. The force, for example, may be a material bias that is balanced between the second edge of contact 97 and the third edge of contact 98.

In some embodiments, it is contemplated that the first skirt 64 and support arm 90 may not be in direct contact at the first edge of contact 96 but, rather, may be metered or tightly gapped. In this manner, the first edge of contact 96 may be a metered gap that may discourage air flow around the first skirt 64 and the radiation shield 62 and/or the second skirt 66 into the interior space 72. In general, the metered gap at the first edge of contact 96 is less than about 5 thousandths of an inch (mils). In some approaches, the metered gap at the first edge of contact 96 may be between about 1 and 10 mils, about 1 and 5 mils, and, in some aspects, about 1 and 3 mils. Accordingly, in such an embodiment, the skirted leaf seal 50 may seals the gap 42 via two edges of contact—the second edge of contact 97 and the third edge of contact 98. A configuration utilizing a metered gap at the first edge of contact 96 may reduce friction between the first skirt 64 and the radiation shield 62 and/or the second skirt 66 and may also reduce risk of the first skirt 64 binding on the radiation shield 62 and/or the second skirt 66.

The distal end portion 70 of the wall arm 54 may engage the distal end portion 93 of the support arm 90, in either an expanded or fully compressed state. As shown in the extended state in FIG. 13 there may be a metered gap 99 between a distal end portion 70 of the wall arm 54 and the second skirt 66, in particular, the skirt lip 66a. The metered gap 99 may discourage or reduce the flow of pressurized air, such as core air of a turbine nozzle assembly, behind the wall arm 54. Accordingly, metered gap 99 may seal a space between the support arm 90 and the wall arm 54. In some approaches, the metered gap 99 may be less than about 5 mils.

Figure 14:
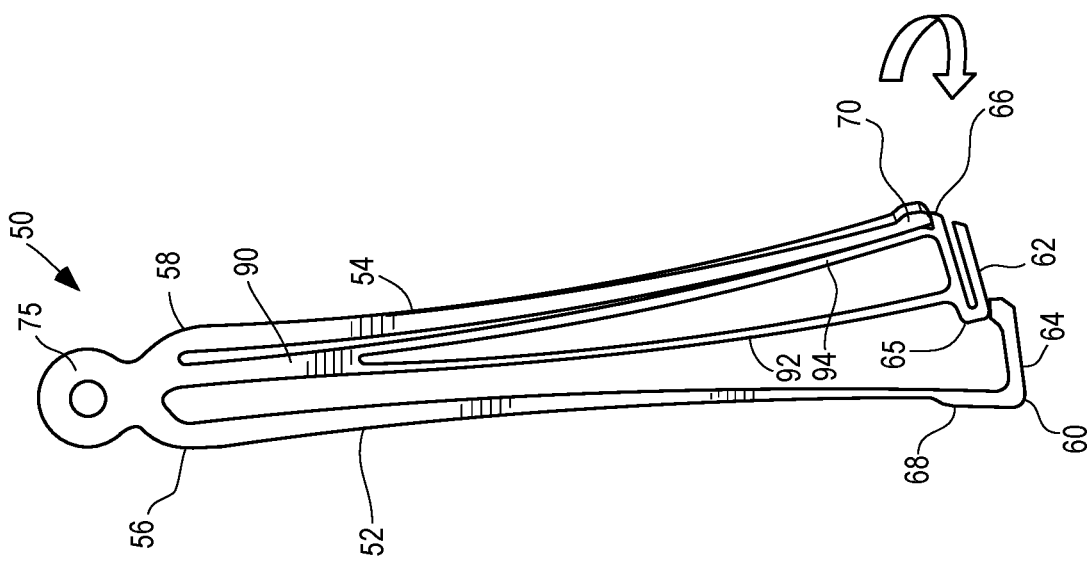
FIG. 14 is a front, side elevation view of the seal of FIG. 5, depicting the seal subjected to torsion.
Figure 15:
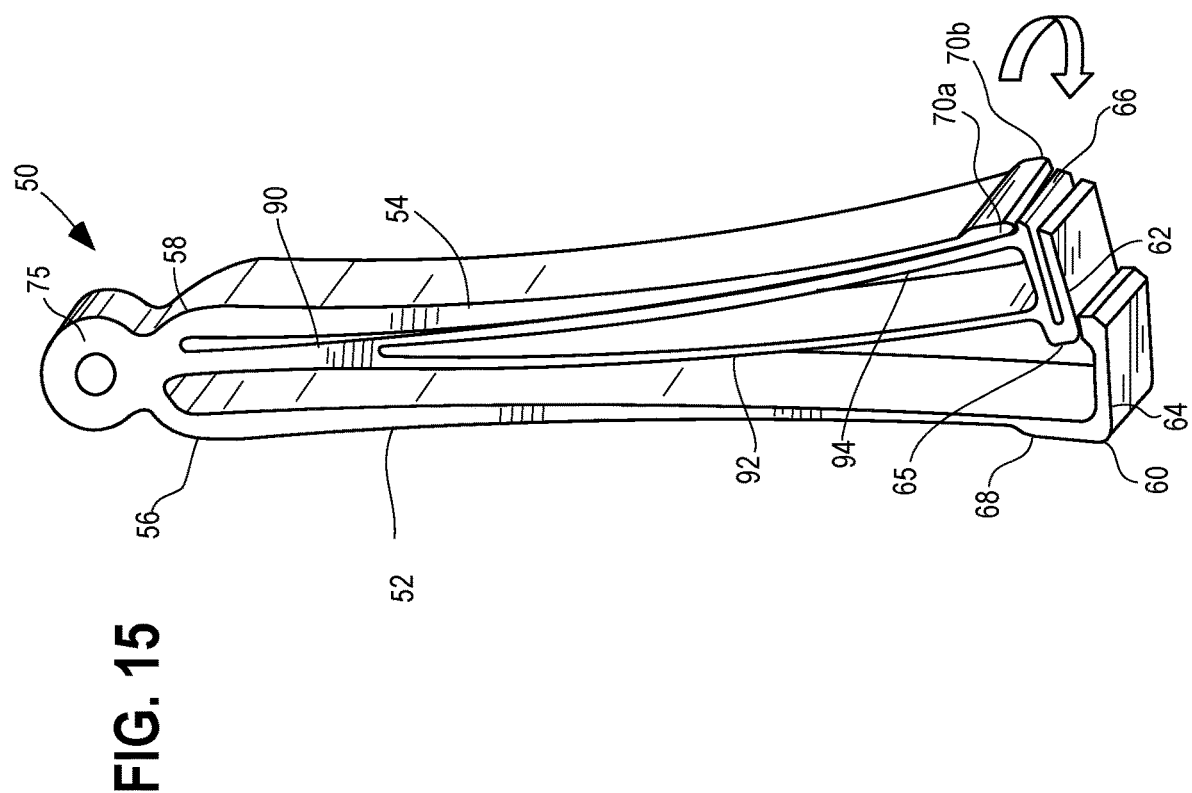
FIG. 15 is a bottom perspective view of the seal of FIG. 14, depicting the seal subjected to torsion.

With reference to FIGS. 14-15, the wall arm 54 may twist to contour, for example, to accommodate a distortion in a structure (e.g., the sidewall 16 in FIGS. 11-13) adjacent the wall arm 54. When subjected to torsion, the distal end portion 70 of the wall arm 54 may flex to set against the structure. Further, the support arm 90 may help to prevent twisting of the wall arm 54 when the wall arm 54 is subjected to external forces. In this manner, incorporation of the support arm 90 may permit the distal end portion 70 of the skirted leaf seal 50 to yield elastically when an external force is applied, while still sealing a gap (e.g., the gap 42 between the flap 14 and the sidewall 16) and while still sealing an internal space within the skirted leaf seal (e.g., the interior space 72 of the skirted leaf seal 50). Such an external force may be applied to the skirted leaf seal 50, for example, via distortion or shifting of a structure adjacent to the skirted leaf seal 50.

As shown in FIG. 15, when the wall arm 54 is subjected to torsion, a front distal end portion 70a moves towards the support arm 90 and a rear distal end portion 70b moves away from the support arm 90. Thus, portions of the wall arm 54 set against the support arm 90 to adapt to torsional forces and maintain a seal between the wall arm 54 and a structure.

Not wishing to be bound by theory, it is contemplated that the skirted leaf seals 50 described herein may facilitate contouring against shifting and distorted surfaces by separating the skirt (e.g., the second skirt 66 of the support arm 90) from the sealing arm or leaf (e.g., the wall arm 54). Such an arrangement may also reduce the amount of torsion on the skirt (e.g., the second skirt 66 of the support arm 90) by separating the main loading element (e.g., the wall arm 54) from the skirt.

It is contemplated that other skirt configurations may be used as long as the first skirt 64 follows the second skirt 66 and/or radiation shield 62 and the second skirt 66 follows the distal end portion 70 of the wall arm 54.

It is contemplated that the skirted leaf seals described herein may be installed in any moveable and/or dynamic gap, for example, between any form of moveable flap and stationary structure.

Further aspects of the invention are provided by the subject matter of the following clauses:

A seal apparatus, comprising: a first seal having a first proximal end portion, a first distal end portion with a first bend, and a first skirt extending away from the first bend; a second seal opposite the first seal and defining an interior space therebetween, the second seal having a second proximal end portion coupled to the first proximal end portion and a second distal end portion, the first skirt extending into the interior space; and a support associated with the second seal, the support being disposed in the interior space, wherein the first seal biases away from the second seal to seal a gap between a moveable flap and a stationary structure.

The seal apparatus of any preceding clause wherein the first seal, the second seal, and the support are a single piece of material.

The seal apparatus of any preceding clause wherein the first seal, the second seal, and the support are flexurally related such that the first seal, the second seal, and the support have a predetermined movement.

The seal apparatus of any preceding clause wherein a proximal end of the support is coupled to the first proximal end portion and the second proximal end portion, the support having a first resilient sheet, a second resilient sheet, and a second skirt extending between a distal end of the first resilient sheet and a distal end of the second resilient sheet.

The seal apparatus of any preceding clause wherein the second skirt includes a hairpin bend attached to a radiation shield, the radiation shield being disposed outwardly the second skirt.

The seal apparatus of any preceding clause wherein the first skirt slidingly engages the second skirt.

The seal apparatus of any preceding clause wherein the second distal end portion is enlarged and an intermediate portion extends between the second distal end portion and the second proximal end portion, the second distal end portion having a thickness greater than a thickness of the intermediate portion.

The seal apparatus of any preceding clause wherein the second distal end portion includes at least a first surface of contact, the first surface of contact sealing a space between the second seal and the stationary structure.

The seal apparatus of any preceding clause wherein the bend of the first seal provides a second surface of contact, the second surface of contact sealing a space between the first seal and the moveable flap.

The seal apparatus of any preceding clause wherein the seal apparatus exerts a force to urge the support towards the second seal to seal a space between the second seal and the stationary structure.

The seal apparatus of any preceding clause wherein the first seal and the second seal include a common attachment for mounting the first seal and the second seal for rotation, and wherein the first seal is an elongate sheet and the second seal is an elongate sheet.

A gas turbine nozzle, comprising: a sidewall; a movable flap adjacent the sidewall; and a seal apparatus disposed between the sidewall and the moveable flap to seal a gap between the sidewall and the moveable flap, the seal apparatus operably coupled to the moveable flap and comprising: a first seal having a first proximal end portion, a first distal end portion with a first bend, and a first skirt extending away from the first bend; a second seal opposite the first seal and defining an interior space therebetween, the second seal having a second proximal end portion coupled to the first proximal end portion the first seal, the first skirt extending into the interior space; and a support arm associated with the second seal, the support being disposed in the interior space, wherein the first seal biases away from the second seal to seal the gap.

The gas turbine nozzle of any preceding clause wherein the seal apparatus exerts a force to urge the first seal towards the moveable flap and to urge the second seal towards the sidewall to seal the gap.

The gas turbine nozzle of any preceding clause wherein the first seal and the second seal include a common attachment for mounting the first seal and the second seal for relative rotation, and wherein the seal apparatus is operably coupled to the movable flap via a housing, the housing comprising a cantilever coupled to the common attachment.

The gas turbine nozzle of any preceding clause wherein the cantilever counteracts a core pressure of the gas turbine nozzle.

A method of sealing a dynamic gap using a seal apparatus, the seal apparatus comprising: a first seal having a first proximal end portion, a first distal end portion with a first bend, and a first skirt extending away from the first bend; a second seal opposite the first seal and defining an interior space therebetween, the second seal having a second distal end portion and a second proximal end portion coupled to the first proximal end portion, the first skirt extending into the interior space; and a support associated with the second seal, the support being disposed in the interior space, wherein the first seal biases away from the second seal, the method comprising: contacting at least two surfaces with the first distal end portion and the second distal end portion; and moving automatically at least the second distal end portion relative to one of the at least two surfaces in response to the gap changing size.

The method of any preceding clause wherein the method seals the dynamic gap using at least two seal apparatuses.

The method of any preceding clause further comprising the step of: moving automatically the support in response to a movement in the second seal, and integrally relating the motion of the support and the second seal.

The method of any preceding clause wherein the support includes a second skirt that engages the first skirt to seal the interior space.

The method of any preceding clause further comprising the step of distorting the second seal according to a contour of at least one of the surfaces.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

The invention claimed is:

1. A seal apparatus, comprising:
a first seal having a first proximal end portion, a first distal end portion with a first bend, and a first skirt extending away from the first bend;
a second seal opposite the first seal and defining an interior space therebetween, the second seal having a second proximal end portion coupled to the first proximal end portion and a second distal end portion, the first skirt extending into the interior space; and
a support associated with the second seal, the support being disposed in the interior space and including a second skirt,
wherein the first seal biases away from the second seal to seal a gap between a movable flap and a stationary structure, and wherein the first skirt and the second skirt overlap to seal the interior space.

2. The seal apparatus of claim 1, wherein the first seal, the second seal, and the support are a single piece of material.

3. The seal apparatus of claim 1, wherein the first seal, the second seal, and the support are flexurally related such that the first seal, the second seal, and the support have a predetermined movement.

4. The seal apparatus of claim 1, wherein a proximal end of the support is coupled to the first proximal end portion and the second proximal end portion, the support having a first resilient sheet, a second resilient sheet, and a wherein the second skirt extends between the first resilient sheet the second resilient sheet.

5. The seal apparatus of claim 4, wherein the second skirt includes a hairpin bend attached to a radiation shield, the radiation shield being disposed outwardly the second skirt.

6. The seal apparatus of claim 4, wherein the first skirt slidingly engages the second skirt.

7. The seal apparatus of claim 1, wherein the second distal end portion is enlarged and an intermediate portion extends between the second distal end portion and the second proximal end portion, the second distal end portion having a thickness greater than a thickness of the intermediate portion.

8. The seal apparatus of claim 1, wherein the second distal end portion includes at least a first surface of contact, the first surface of contact sealing a space between the second seal and the stationary structure.

9. The seal apparatus of claim 1, wherein the first bend of the first seal provides a second surface of contact, the second surface of contact sealing a space between the first seal and the movable flap.

10. The seal apparatus of claim 1, wherein the seal apparatus exerts a force to urge the support towards the second seal to seal a space between the second seal and the stationary structure.

11. The seal apparatus of claim 1, wherein the first seal and the second seal include a common attachment for mounting the first seal and the second seal for rotation, and wherein the first seal is an elongate sheet and the second seal is an elongate sheet.

12. A gas turbine nozzle, comprising:
a sidewall;
a movable flap adjacent the sidewall; and
a seal apparatus disposed between the sidewall and the movable flap to seal a gap between the sidewall and the movable flap, the seal apparatus operably coupled to the movable flap and comprising:
a first seal having a first proximal end portion, a first distal end portion with a first bend, and a first skirt extending away from the first bend;
a second seal opposite the first seal and defining an interior space therebetween, the second seal having a second proximal end portion coupled to the first proximal end portion of the first seal, the first skirt extending into the interior space; and
a support associated with the second seal and including a second skirt, the support being disposed in the interior space,
wherein the first seal biases away from the second seal to seal the gap, and wherein the first skirt and the second skirt overlap to seal the interior space.

13. The gas turbine nozzle of claim 12, wherein the seal apparatus exerts a force to urge the first seal towards the movable flap and to urge the second seal towards the sidewall to seal the gap.

14. The gas turbine nozzle of claim 12, wherein the first seal and the second seal include a common attachment for mounting the first seal and the second seal for relative rotation, and wherein the seal apparatus is operably coupled to the movable flap via a housing, the housing comprising a cantilever coupled to the common attachment.

15. The gas turbine nozzle of claim 14, wherein the cantilever counteracts a core pressure of the gas turbine nozzle.

16. A method of sealing a gap using a seal apparatus, the seal apparatus comprising: a first seal having a first proximal end portion, a first distal end portion with a first bend, and a first skirt extending away from the first bend; a second seal opposite the first seal and defining an interior space therebetween, the second seal having a second distal end portion and a second proximal end portion coupled to the first proximal end portion, the first skirt extending into the interior space; and a support associated with the second seal, the support being disposed in the interior space, wherein the first seal biases away from the second seal, the method comprising:
contacting at least two surfaces with the first distal end portion and the second distal end portion;
moving automatically at least the second distal end portion relative to one of the at least two surfaces in response to the gap changing size; and
moving automatically the support in response to a movement in the second seal, and integrally relating the motion of the support and the second seal.

17. The method of claim 16, wherein the method seals the gap using at least two seal apparatuses.

18. The method of claim 16, wherein the support includes a second skirt that engages the first skirt to seal the interior space.

19. The method of claim 16 further comprising the step of: distorting the second seal according to a contour of at least one of the surfaces.

* * * * *

UNITED STATES PATENT AND TRADEMARK OFFICE
CERTIFICATE OF CORRECTION

PATENT NO. : 11,674,447 B2
APPLICATION NO. : 17/361479
DATED : June 13, 2023
INVENTOR(S) : Shealy et al.

It is certified that error appears in the above-identified patent and that said Letters Patent is hereby corrected as shown below:

In the Claims

In Column 19, Claim 4, Line 50, delete "and a wherein", and insert -- wherein --, therefor.

In Column 19, Claim 4, Line 51, delete "the", and insert -- and the --, therefor.

Signed and Sealed this
Fifth Day of September, 2023

Katherine Kelly Vidal
*Director of the United States Patent and Trademark Office*